United States Patent
Suzuki et al.

(10) Patent No.: US 9,180,767 B2
(45) Date of Patent: Nov. 10, 2015

(54) HYBRID VEHICLE

(71) Applicant: HONDA MOTOR CO., LTD., Tokyo (JP)

(72) Inventors: Takabumi Suzuki, Saitama (JP); Keiichi Ooiso, Saitama (JP); Takeshi Hoshinoya, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/400,750

(22) PCT Filed: May 22, 2013

(86) PCT No.: PCT/JP2013/064203
§ 371 (c)(1),
(2) Date: Nov. 12, 2014

(87) PCT Pub. No.: WO2013/176175
PCT Pub. Date: Nov. 28, 2013

(65) Prior Publication Data
US 2015/0129345 A1    May 14, 2015

(30) Foreign Application Priority Data

May 23, 2012 (JP) ................................. 2012-117618
Sep. 4, 2012 (JP) ................................. 2012-194331

(51) Int. Cl.
*B60K 6/405* (2007.10)
*B60K 6/547* (2007.10)
*B60K 13/04* (2006.01)
*B60K 6/365* (2007.10)
*B60K 6/24* (2007.10)
*B60K 6/40* (2007.10)
(Continued)

(52) U.S. Cl.
CPC . *B60K 6/405* (2013.01); *B60K 6/24* (2013.01); *B60K 6/26* (2013.01); *B60K 6/36* (2013.01);
(Continued)

(58) Field of Classification Search
CPC ........ B60K 6/405; B60K 6/547; B60K 6/365; B60K 6/26; B60K 6/44; B60K 6/36; B60K 6/52; B60K 6/40; B60K 13/04; B60K 6/24; Y10S 903/951; B60Y 2200/91; Y02T 10/6265; Y02T 10/6295; F01N 2340/04; F01N 13/08; F01N 5/02
USPC ........................ 180/296, 297, 68.1, 68.2, 68.3
See application file for complete search history.

(56) References Cited

U.S. PATENT DOCUMENTS
5,445,241 A * 8/1995 Nakamura et al. ............. 180/296
5,490,572 A * 2/1996 Tajiri et al. .................... 180/65.1
(Continued)

FOREIGN PATENT DOCUMENTS
JP    05169981 A * 7/1993 ............... B60K 1/04
(Continued)

OTHER PUBLICATIONS
International Search Report dated Jun. 18, 2013, issued in corresponding application No. PCT/JP2013/064203.
(Continued)

*Primary Examiner* — Brodie Follman
*Assistant Examiner* — Bridget Avery
(74) *Attorney, Agent, or Firm* — Westerman, Hattori, Daniels & Adrian, LLP

(57) ABSTRACT

A hybrid vehicle includes an internal combustion engine, an exhaust passageway, and a driving system having a first and a second motors and a housing which houses the first and the second motors. The driving system is disposed further rearwards than the internal combustion engine in a front-rear direction of the vehicle. The exhaust passageway extends from the internal combustion engine towards a rear side of the vehicle and is disposed so as to surround: a first plane passing through a front end of the housing and perpendicular to the front-rear direction; a second plane passing through a rear end of the housing and perpendicular to the front-rear direction; a third plane passing through a left end of the housing and perpendicular to a left-right direction; and a fourth plane passing through a right end of the housing and perpendicular to the left-right direction.

19 Claims, 13 Drawing Sheets

(51) Int. Cl.
  *B60K 6/52* (2007.10)
  *B60K 6/26* (2007.10)
  *B60K 6/36* (2007.10)
  *B60K 6/44* (2007.10)
  *F01N 5/02* (2006.01)
  *F01N 13/08* (2010.01)

(52) U.S. Cl.
  CPC . *B60K 6/365* (2013.01); *B60K 6/40* (2013.01); *B60K 6/44* (2013.01); *B60K 6/52* (2013.01); *B60K 6/547* (2013.01); *B60K 13/04* (2013.01); *B60Y 2200/92* (2013.01); *F01N 5/02* (2013.01); *F01N 13/08* (2013.01); *F01N 2340/04* (2013.01); *Y02T 10/6265* (2013.01); *Y02T 10/6295* (2013.01); *Y10S 903/951* (2013.01)

(56) References Cited

U.S. PATENT DOCUMENTS

| | | | |
|---|---|---|---|
| 2003/0106683 A1* | 6/2003 | Klotten et al. | 165/283 |
| 2009/0205892 A1 | 8/2009 | Jensen et al. | |
| 2009/0277707 A1* | 11/2009 | Ballard | 180/68.2 |
| 2010/0032226 A1* | 2/2010 | Yokoi | 180/229 |
| 2010/0121508 A1 | 5/2010 | Murata et al. | |
| 2010/0270098 A1* | 10/2010 | Buell | 180/225 |
| 2012/0178576 A1* | 7/2012 | Beechie et al. | 475/160 |
| 2013/0235526 A1* | 9/2013 | Watanabe | 361/699 |
| 2013/0247864 A1* | 9/2013 | Samie et al. | 123/196 AB |
| 2014/0196972 A1* | 7/2014 | Sangha et al. | 180/309 |
| 2014/0216843 A1* | 8/2014 | Holoweiko et al. | 180/309 |

FOREIGN PATENT DOCUMENTS

| | | |
|---|---|---|
| JP | 2002-144888 A | 5/2002 |
| JP | 2009-108808 A | 5/2009 |
| JP | 2010-113974 A | 5/2010 |
| JP | 2011-097706 A | 5/2011 |

OTHER PUBLICATIONS

Written Opinion dated Jun. 18, 2013, issued in corresponding application No. PCT/JP2013/064203.

* cited by examiner

HYBRID VEHICLE

TECHNICAL FIELD

The present invention relates to a hybrid vehicle and more particularly to a hybrid vehicle which includes an internal combustion engine and a driving system having a motor and disposed away from the internal combustion engine.

BACKGROUND ART

A hybrid vehicle is devised in which front wheels are driven by an internal combustion engine and rear wheels are driven by a motor. In this hybrid vehicle, an exhaust pipe, which extends from the internal combustion engine in a front-rear direction of the vehicle, is disposed on the opposite side to a battery unit and a power drive across a fuel tank, and so the power driving unit and a cooling system can be prevented from being badly affected by heat from the exhaust pipe (for example, refer to Patent Literature 1).

In addition, conventionally, in a vehicle 100 described in Patent Literature 2, as shown in FIG. 11, power generated from an engine 101 is transmitted to front wheels FR, FL via a transmission 103 to drive the front wheels FR, FL, and rear wheels RR, RL are driven individually by motors MRR, MRL which incorporated in the rear wheels. The motors MRR, MRL are so-called in-wheel motors and each includes a traction motor, a cooling mechanism 102, a speed reducing mechanism and the like. The cooling mechanism 102 includes cooling lubricant, an oil pump, an oil cooler and the like, which are all not shown. When there is a need to cool the traction motors, the supply amount of the cooling lubricant is controlled as required to cool the traction motors. Additionally, an exhaust pipe 104 for discharging exhaust gas extends from the engine 101 which is mounted at a front side of the vehicle towards the rear side of the vehicle and branches to the left and right sides at a rear part of the vehicle. Since the temperatures or the cooling performances of the motors MRR, MRL are affected when the exhaust pipe 104 is heated to a high temperature, it is described that the supply amount of the cooling lubricant to the motors MRR, MRL is controlled according to the calorific value of the engine 101.

RELATED ART REFERENCES

Patent Literatures

Patent Literature 1: JP-A-2002-144888 (FIG. 2)
Patent Literature 2: JP-A-2011-97706

SUMMARY OF THE INVENTION

Problem that the Invention is to Solve

Incidentally, in a hybrid vehicle, it is presumed that a motor is warmed up when the vehicle is used in extremely low temperature conditions. In the hybrid vehicle described in Patent Literature 1, according to the arrangement described above, the exhaust pipe is disposed close to the motor and a differential. However, the temperature raising effect by the heat of the exhaust pipe is not taken into consideration, and a further improvement is desired to obtain a sufficient temperature raising effect.

In the vehicle 100 described in Patent Literature 2, when attempting to raise the temperature of the oil pump of the cooling mechanism 102 by the heat of the exhaust pipe 104 while the vehicle is running, since the flow of running air hits directly the oil pump, not only it becomes difficult to obtain the temperature raising effect, but also there are fears that the oil pump is cooled excessively to increase the resistance of the oil pump.

The invention has been made in view of the problems, and an object thereof is to provide a hybrid vehicle which can raise the temperature of a driving system having a motor with good efficiency by the heat of exhaust gas which passes through an exhaust pipe.

Means for Solving the Problem

In order to achieve the above-mentioned object, the invention according to claim 1 is characterized by a hybrid vehicle (e.g., a vehicle 3 in embodiment) including:
an internal combustion engine (e.g., an internal combustion engine 4 in embodiment);
an exhaust passageway (e.g., an exhaust passageway 80 in embodiment) through which exhaust gas of the internal combustion engine passes; and
a driving system (e.g., a rear wheel driving system 1 in embodiment) having:
a first and a second motors (e.g., a first and a second motors 2A, 2B in embodiment) which are connected to wheels (e.g., a left and right rear wheels LWr, RWr in embodiment) of the vehicle to enable to transmit power; and
a housing (e.g., a case 11 in embodiment) which houses the first and the second motors and disposed away from the internal combustion engine, wherein:
the driving system is disposed further rearwards than the internal combustion engine in a front-rear direction of the vehicle; and
the exhaust passageway extends from the internal combustion engine towards a rear side of the vehicle and is disposed so as to surround:
a first plane (e.g., a first plane S1 in embodiment) which passes through a front end of the housing and which is perpendicular to the front-rear direction of the vehicle;
a second plane (e.g., a second plane S2 in embodiment) which passes through a rear end of the housing and which is perpendicular to the front-rear direction of the vehicle;
a third plane (e.g., a third plane S3 in embodiment) which passes through a left end of the housing and which is perpendicular to a left-right direction of the vehicle; and
a fourth plane (e.g., a fourth plane S4 in embodiment) which passes through a right end of the housing and which is perpendicular to the left-right direction of the vehicle.

In the invention, although the exhaust passageway is described so surrounding the first plane to the fourth plane, the exhaust passageway may be formed so as to surround at least part of each of the planes. Namely, the exhaust passageway may have portions opposite to at least part of each of the planes.

Further, the invention according to claim 2 is characterized in that, in addition to the configuration according to claim 1,
the exhaust passageway is connected to the internal combustion engine at one end portion thereof and includes:
a first exhaust passageway (e.g., a first exhaust passageway 81A in embodiment) which passes through a far side of the first motor in relation to the second motor in an alignment direction of the first and the second motors; and
a second exhaust passageway (e.g., a second exhaust passageway 81B in embodiment) which passes through a far side of the second motor in relation to the first motor in the alignment direction.

Further, the invention according to claim 3 is characterized in that, in addition to the configuration according to claim 2:

the first exhaust passageway and the second exhaust passageway include a common portion (e.g., a common portion 89 in embodiment) where the first and the second exhaust passageways form a common flow path at a portion closer to the internal engine than to the first plane; and the common portion is disposed at a position intersecting with an imaginary plane (e.g., an imaginary plane P in embodiment) which is perpendicular to the alignment direction of the first and the second motors and which is disposed at an equal distance from the first and the second motors.

Further, the invention according to claim 4 is characterized by, in addition to the configuration according to claim 3, further including an oil pump (e.g., an oil pump 70 in embodiment) which is disposed on an outer surface (e.g., a front side surface 11ƒ in embodiment) of the driving system and which can receive heat from the exhaust passageway, wherein the oil pump is disposed in a rear horizontal projection area (e.g., a rear horizontal projection area P1 in embodiment) of the common portion.

Further, the invention according to claim 5 is characterized in that, in addition to the configuration according to claim 4, the exhaust passageway, the oil pump and the driving system are disposed in this order from a front side in the front-rear direction.

Further, the invention according to claim 6 is characterized in that, in addition to the configuration according to claim 4 or 5, the exhaust passageway and a surface (e.g., a front surface 70a in embodiment) of the oil pump which is directed to a front side in the front-rear direction are disposed opposite to each other.

Further, the invention according to claim 7 is characterized in that, in addition to the configuration according to any of claims 4 to 6, at least a portion of the exhaust passageway which is positioned further forwards in the front-rear direction than a surface of the oil pump which is directed to a front side in the front-rear direction is disposed further downwards than a lowermost surface (e.g., a vertically lowermost surface L in embodiment) of the oil pump in a vertical direction.

Further, the invention according to claim 8 is characterized in that, in addition to the configuration according to claim 7, the exhaust passageway is formed so as to be inclined in the front-rear direction so that a side closer to the oil pump is lower than a side closer to the internal combustion engine in the vertical direction, at a portion which is further forwards in the front-rear direction than the surface of the oil pump which is directed to the front side in the front-rear direction.

Further, the invention according to claim 9 is characterized in that, in addition to the configuration according to any of claims 4 to 8, a surface (e.g., the front surface 70a in embodiment) of the oil pump which is directed to a front side in the front-rear direction is formed so as to have a plane perpendicular to the front-rear direction.

Further, the invention according to claim 10 is characterized in that, in addition to the configuration according to any of claims 4 to 9:

a diameter-expanded portion (e.g., a diameter-expanded portion 88 in embodiment) where the exhaust passageway is expanded radially is provided along the exhaust passageway in a position which is further forwards than the oil pump in the front-rear direction; and the oil pump is disposed in a rear horizontal projection area (e.g., a rear horizontal projection area P2 in embodiment) of the diameter-expanded portion in addition to the rear horizontal projection area of the common portion.

Further, the invention according to claim 11 is characterized in that, in addition to the configuration according to any of claims 4 to 10, the oil pump is disposed outside an upper vertical projection area (e.g., an upper vertical projection area P3 in embodiment) of the exhaust passageway.

Further, the invention according to claim 12 is characterized in that, in addition to the configuration according to claim 11, the oil pump is constituted by an electric oil pump which is electrically driven.

Further, the invention according to claim 13 is characterized in that, in addition to the configuration according to any of claims 2 to 12, the internal combustion engine is disposed in a position intersecting with an imaginary plane which is perpendicular to the alignment direction of the first and the second motors and which is disposed at an equal distance from the first and the second motors.

Further, the invention according to claim 14 is characterized in that, in addition to the configuration according to any of claims 1 to 13:

the driving system further includes a first and a second speed changers (e.g., a first and a second planetary gear type speed reducers 12A, 12B in embodiment) in addition to the first and the second motors;

the first motor and the first speed changer are connected to a left wheel (e.g., a left rear wheel LWr in embodiment) of the vehicle to enable to transmit power;

the second motor and the second speed changer are connected to a right wheel (e.g., a right rear wheel RWr in embodiment) of the vehicle to enable to transmit power;

the first motor is disposed on a left side in the left-right direction, and the second motor is disposed on a right side in the left-right direction; and the first and the second speed changers are disposed inside the first and the second motors in the left-right direction.

Further, the invention according to claim 15 is characterized in that, in addition to the configuration according to claim 14:

respective rotational axes of the first motor, the first speed changer, the second motor, and the second speed changer are disposed on a same axis (e.g., an axis x in embodiment);

the first speed changer is disposed on a power transmission path between the first motor and the left wheel;

the second speed changer is disposed on a power transmission path between the second motor and the right wheel;

a power transmission path between the first motor and the first speed changer has a hollow structure (e.g., a cylindrical shaft 16A in embodiment);

a power transmission path between the first speed changer and the left wheel is inserted through an inside of the hollow structure;

a power transmission path between the second motor and the second speed changer has another hollow structure (e.g., a cylindrical shaft 16B in embodiment); and a power transmission path between the second speed changer and the right wheel is inserted through an inside of the another hollow structure.

Further, the invention according to claim 16 is characterized in that, in addition to the configuration according to claim 15, the first and the second speed changers are planetary gear mechanisms.

Further, the invention according to claim 17 is characterized in that, in addition to the configuration according to any of claims 14 to 16, the first and the second speed changers are formed by connecting together at least one element which constitutes the first speed changer and at least one element which constitutes the second speed changer.

Further, the invention according to claim 18 is characterized in that, in addition to the configuration according to any of claims 1 to 17, the exhaust passageway is disposed so as to define a gap with respect to the housing over an entire length thereof.

Further, the invention according to claim 19 is characterized in that, in addition to the configuration according to any of claims 1 to 18, the internal combustion engine is connected to wheels of the vehicle to enable to transmit power.

Advantage of the Invention

According to the invention of claim 1, the exhaust passageway is disposed so as to surround the four circumferential surfaces of the housing. This enables the housing to be warmed up from the four sides by the heat of the exhaust passageway, thereby making it possible to raise the temperatures of the first and second motors which are installed in the housing.

According to the invention of claim 2, the first exhaust passageway and the second exhaust passageway are disposed parallel on the first motor side and the second motor side of the driving system. In comparison with a situation where the first exhaust passageway and the second exhaust passageway are disposed in series on the first motor side and the second motor side of the driving system, this arrangement enables the housing to be warmed up while reducing the difference in the heat receiving amount in the alignment direction of the first motor and the second motor.

According to the invention of claim 3, since the common portion is disposed in the position at an equal distance from the first and second motors and closer to the internal combustion engine than to the first and second motors, the heat receiving amount of the first and second motors can be even.

According to the invention of claim 4, the oil pump is disposed in the rear horizontal projection area of the common portion. This enables the running air warmed up by the heat of the exhaust passageway to flow to the rear side to hit the oil pump while the vehicle is running, whereby the temperature of the oil pump can be raised effectively. Additionally, when the vehicle is stopped, the heat of the exhaust passageway rises vertically, and this can prevent an excessive heat from transmitting to the oil pump.

According to the invention of claim 5, the driving system is not disposed on the front side of the oil pump, and this can prevent the driving system from interrupting the heat transmission from the exhaust passageway and disrupting the temperature increase of the oil pump.

According to the invention of claim 6, the exhaust passageway and the oil pump are disposed opposite to each other without other members interposed therebetween, and this prevents the heat of the exhaust passageway from being interrupted by the other members, whereby the heat from the exhaust passageway can be transmitted to the oil pump in an ensured manner.

According to the invention of claim 7, while the vehicle is running, the running air warmed up by the heat of the exhaust passageway rises while flowing to the rear side, and therefore, in comparison with a situation where the exhaust passageway is disposed further upwards than the lowermost surface of the oil pump in the vertical direction, the portion which can receive the heat of the oil pump is increased, whereby the whole of the oil pump can be warmed up with good efficiency.

According to the invention of claim 8, in comparison with a situation where the exhaust passageway is formed horizontally, the rear horizontal projection area of the exhaust passageway can be increased. Additionally, in comparison with a situation where the exhaust passageway is formed so as to be inclined in such a way that the side thereof which is positioned far away from the oil pump is disposed further downwards than the other side, the oil pump can receive more of the running air which is warmed up by the exhaust passageway to rise from a lower side thereof, whereby the temperature of the oil pump can be increased with good efficiency.

According to the invention of claim 9, the running air warmed up by the exhaust passageway hits the front surface of the oil pump, whereby the temperature of the oil pump can be increased with good efficiency.

According to the invention of claim 10, the oil pump can be warmed up by the heat of both the common portion and the diameter-expanded portion.

According to the invention of claim 11, the oil pump is not disposed above the exhaust passageway, and therefore, the heat rising vertically from the exhaust passageway while the vehicle is stopped does not hit the oil pump. Consequently, it is prevented that the viscosity of oil in the oil pump is reduced extremely low as a result of the oil pump being overheated while the vehicle is stopped.

According to the invention of claim 12, the oil pump is not heated directly while the vehicle is stopped, whereby it is possible to prevent a reduction in performance of a motor of the oil pump.

According to the invention of claim 13, since the internal combustion engine is disposed on a central dividing plane of the driving system, the lengths of the first and second exhaust passageways can be made substantially the same, whereby the heat receiving amount of the first and second motors can be made even.

According to the invention of claim 14, since the first and second motors are disposed side by side in the left-right direction, in comparison with a situation where the first and second motors are disposed side by side in the front-rear direction, the difference in the heat receiving amount of the first and second motors can be suppressed to a low level, whereby the first and second motors can receive heat evenly.

In addition, in general, a motor has more elements per unit space than a transmission. Since the motors which have more elements per unit space in the housing are disposed laterally outwards in the left-right direction, the motors can receive the heat from the exhaust passageway efficiently.

According to the invention of claim 15, the rotational axes of the four rotational members are made to coincide by the hollow structures, thereby making it possible to suppress the radial enlargement of the housing. Additionally, since the first and second motors can be disposed at an equal distance from the exhaust passageway, the amounts of heat received thereby can be even.

According to the invention of claim 16, the large reduction gear ratio can be given in the compact configuration by using the planetary gear mechanism.

According to the invention of claim 17, the first and second motors which are in contact with the housing over larger surface areas than the speed changers are connected by the constituent elements of the first and second speed changers. This enables heat to be transmitted between the first and second motors, thereby making it possible to prevent only either of the motors to be overheated.

According to the invention of claim 18, the exhaust passageway is prevented from being brought into contact with the driving system over the entire length thereof, and hence, the exhaust passageway includes no direct heat conductive relationship with the driving system. This can prevent the overheat of the first and second motors which would otherwise be caused when the driving system receives the excessive heat.

According to the invention of claim 19, the internal combustion engine which is connected to the exhaust passageway which warms up the housing constitutes the driving source of the vehicle. This enables the temperatures of the motors to be increased by the heat of the internal combustion engine which is generated when the internal combustion engine generates a driving force which drives the vehicle, this obviating the necessity of a separate heating member such as a heater.

MODE FOR CARRYING OUT THE INVENTION

Hereinafter, a hybrid vehicle having an internal combustion engine disposed at a front portion of the vehicle and a driving system which is disposed away from the internal combustion engine at a rear portion of the vehicle will be described based on the accompanying drawings as an embodiment of the invention.

First Embodiment

Figure 1:
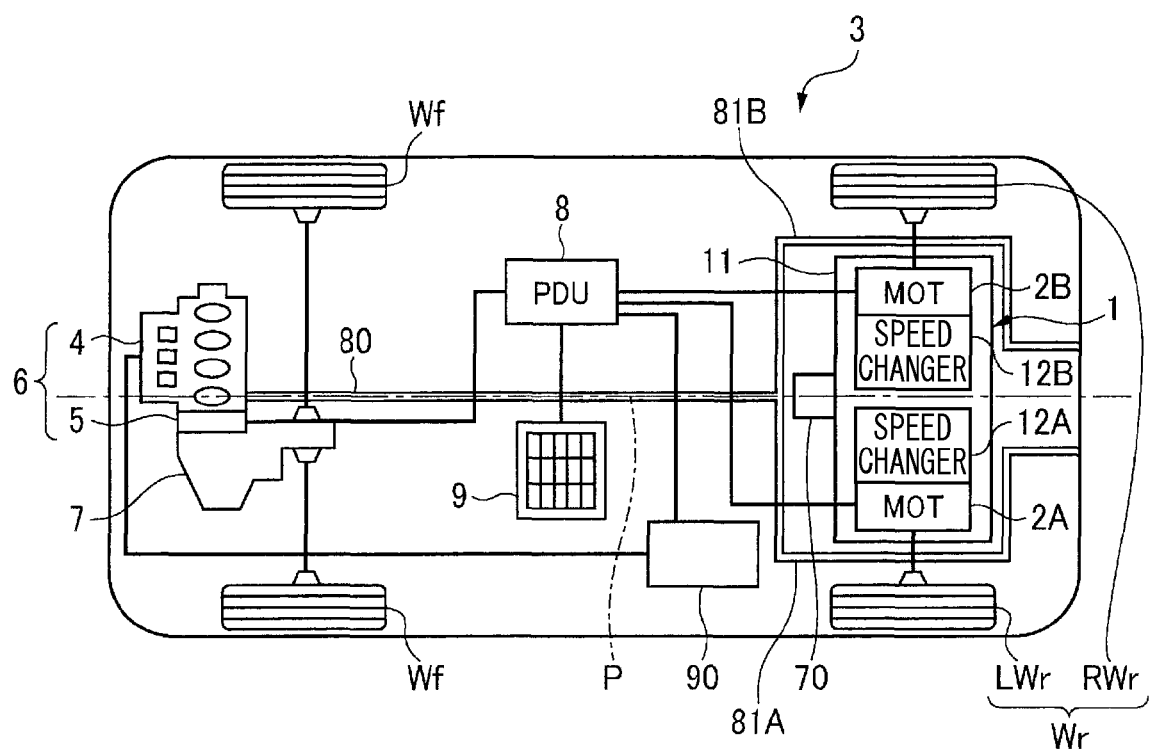
FIG. 1 is a schematic block diagram of a hybrid vehicle according to a first embodiment of the invention.

As shown in FIG. 1, a hybrid vehicle 3 of this embodiment has a driving system 6 (hereinafter, referred to as a front wheel driving system) in which an internal combustion engine 4 and a motor 5 are connected in series at a front portion of the vehicle. Power of this front wheel driving system 6 is transmitted to front wheels Wf via a transmission 7, and power of a driving system 1 (hereinafter, referred to as a rear wheel driving system) which is provided separately from the front wheel driving system 6 at a rear portion of the vehicle is transmitted to rear wheels Wr (RWr, LWr). The rear wheel driving system 1 includes a first and a second motors 2A, 2B, and power of the first motor 2A is transmitted to the left rear wheel LWr, and power of the second motor 2B is transmitted to the right rear wheel RWr.

The motor 5 of the front wheel driving system 6 and the first and second motors 2A, 2B of the rear wheel driving system 1 are connected to a battery 9 via a PDU (Power Driving Unit) 8, so that electric power is supplied thereto from the battery 9 and the energy of the vehicle 3 is recovered therein to be stored in the battery 9 via the PDU 8. The PDU 8 is connected to an ECU 90 and controlled thereby.

Consequently, as shown in FIG. 1, the rear wheel driving system 1 is disposed further rearwards than the internal combustion engine 4 in relation to a front-rear direction of the vehicle 3. Additionally, the internal combustion engine 4 which is connected to the front wheels Wf of the vehicle so as to transmit its power to the front wheels Wf is disposed in a position which intersects an imaginary plane P which is perpendicular to an alignment direction of the first and second motors 2A, 2B and which is disposed at an equal distance from the first and second motors 2A, 2B.

Figure 2:
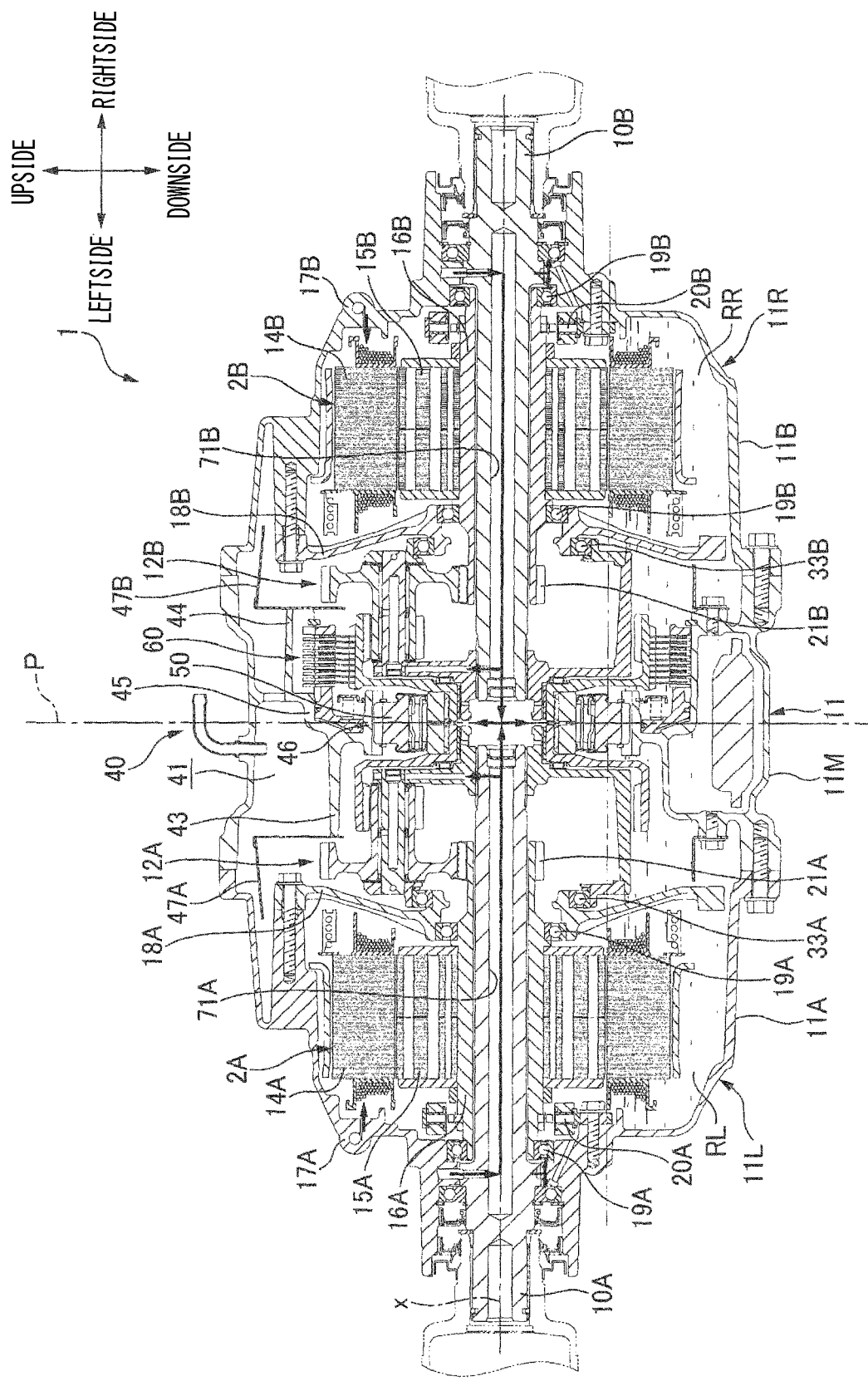
FIG. 2 is a vertical sectional view of a rear wheel driving system.
Figure 3:
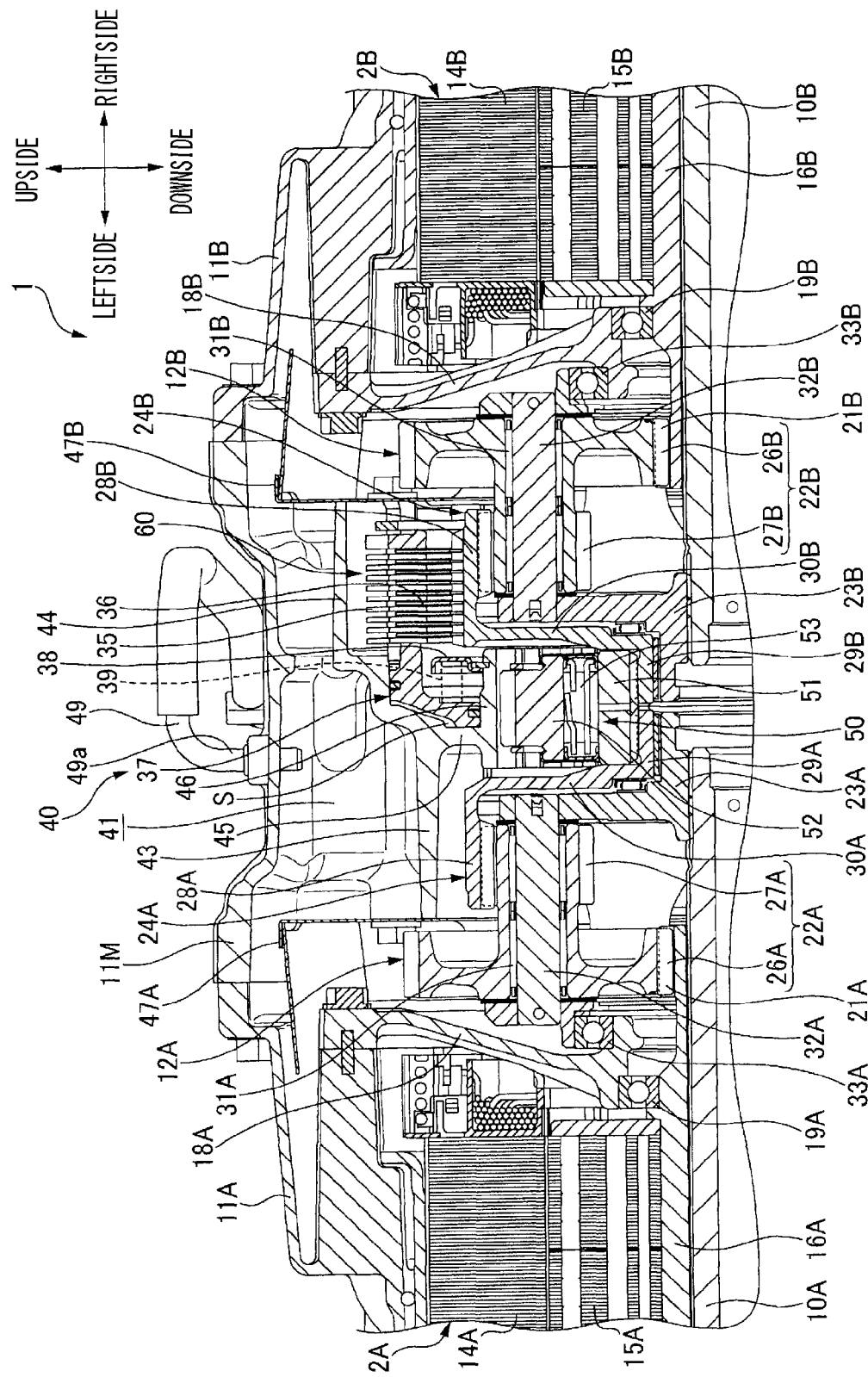
FIG. 3 is a partially enlarged view of an upper portion of the rear wheel driving system shown in FIG. 2.

FIG. 2 shows a vertical sectional view of the whole of the rear wheel driving system 1, and FIG. 3 is a partially enlarged view of an upper portion of FIG. 2. A case 11, which is a housing of the rear wheel driving system 1, includes a central case 11M which is disposed at a substantially central portion in relation to a transverse direction of the vehicle (hereinafter, also referred to as a left-right direction of the vehicle), and a left side case 11A and a right side case 11B which are disposed on left and right sides of the central case 11M so as to sandwich the central case 11M therebetween. The case 11 has a substantially cylindrical shape as a whole. Axles 10A, 10B for the rear wheels Wr, the first and second motors 2A, 2B for driving the axles, and a first and a second planetary gear type speed reducers 12A, 12B as a first and a second speed changers which decelerate the driving rotations of these motors 2A, 2B are housed in an inside of the case 11. The first planetary gear type speed reducer 12A is disposed on a power transmission path between the first motor 2A and the left rear wheel LWr, while the second planetary gear type speed reducer 12B is disposed on a power transmission path between the second motor 2B and the right rear wheel RWr. The axle 10A, the first motor 2A and the first planetary gear type speed reducer 12A are connected to the left rear wheel LWr so that power is transmissible, and control the left rear wheel LWr to be driven. Additionally, the axle 10B, the second motor 2B and the second planetary gear type speed reducer 12B are connected to the right rear wheel RWr so that power is transmissible, and control the right rear wheel RWr to be driven.

Respective rotational axes of the first motor 2A, the first planetary gear type speed reducer 12A, the second motor 2B and the second planetary gear type speed reducer 12B are disposed so as to be aligned on the same axis x. The first motor 2A and the first planetary gear type speed reducer 12A are disposed in this order from an outside of the vehicle 3 in the left-right direction thereof. Additionally, the second motor 2B and the second planetary gear type speed reducer 12B are disposed in this order from the outside of the vehicle 3 in the left-right direction thereof. Consequently, the first and second motors 2A, 2B are disposed outwards of the first and second planetary gear type speed reducers 12A, 12B, respectively. Then, the axle 10A, the first motor 2A and the first planetary gear type speed reducer 12A, and the axle 10B, the second motor 2B and the second planetary gear type speed reducer 12B are disposed laterally symmetrical with each other in relation to the transverse direction of the vehicle in the housing.

Partition walls 18A, 18B which extend radially inwards are provided on central case 11M side of the side cases 11A, 11B, and the first and second motors 2A, 2B are disposed between the side cases 11A, 11B and the partition walls 18A, 18B respectively. Additionally, the first and second planetary gear type speed reducers 12A, 12B are disposed within a space which is surrounded by the central case 11M and the partition walls 18A, 18B. As shown in FIG. 2, in this embodiment, the left side case 11A and the central case 11M define a first case 11L which houses the first motor 2A and the first planetary gear type speed reducer 12A, and the right side case 11B and the central case 11M define a second case 11R which houses the second motor 2B and the second planetary gear type speed reducer 12B. Additionally, the first case 11L has a left reservoir portion RL which reserves oil (hereinafter, also referred to as "lubricating oil") which is used to lubricate and/or cool at least one of the first motor 2A and the power transmission path. The second case 11R has a right reservoir portion RR which reserves oil which is used to lubricate and/or cool at least one of the second motor 2B and the power transmission path.

In the rear wheel driving system 1, a breather device 40 which establishes a communication between the inside and outside of the case 11 is provided so that air in the inside of the case 11 is released to the outside via the breather chamber 41 to prevent the air from being heated to high temperatures or being pressurized to high pressures in the inside of the case 11. The breather chamber 41 is disposed at a vertically upper portion in the case 11 and is constituted by a space defined by an external wall of the central case 11M, a first cylindrical wall 43 which extends substantially horizontally towards the left side case 11A within the central case 11M, a second cylindrical wall 44 which extends substantially horizontally towards the right side case 11B, a left-right separating wall 45 which connects together inner end portions of the first and second cylindrical walls 43, 44, a baffle plate 47A which is mounted so as to be brought into abutment with a distal end portion of the first cylindrical wall 43 which faces the left side case 11A, and a baffle plate 47B which is mounted so as to be brought into abutment with a distal end portion of the second cylindrical wall 44 which faces the right side case 11B.

In the first and second cylindrical walls 43, 44 and the left-right separating wall 45 which define a lower surface of the breather chamber 41, the first cylindrical wall 43 is positioned further radially inwards than the second cylindrical wall 44, and the left-right separating wall 45 extends to an inner end portion of the first cylindrical wall 43 while bending so as to be radially contracted from an inner end portion of the second cylindrical wall 44, and extends further radially inwards to reach a third cylindrical wall 46 which extends substantially horizontally. The third cylindrical wall 46 is positioned further inwards than outer end portions of both the first cylindrical wall 43 and the second cylindrical wall 44 and substantially in the center therebetween.

In the central case 11M, the baffle plates 47A, 47B are fixed so as to divide a space defined between the first cylindrical wall 43 and an external wall of the central case 11M or a space defined between the second cylindrical wall 44 and the external wall of the central case 11M from the planetary gear type speed reducer 12A or the planetary gear type speed reducer 12B.

Additionally, an external communication passageway 49 which establishes a communication between the breather chamber 41 and the outside thereof is connected to a vertical upper surface of the breather chamber 41 in the central case 11M. A breather chamber side end portion 49a of the external communication passageway 49 is disposed so as to be directed vertically downwards. Consequently, the oil is prevented from being discharged to the outside through the external communication passageway 49.

In the first and second motors 2A, 2B, stators 14A, 14B are fixed to the side cases 11A, 11B, respectively, and annular rotors 15A, 15B are disposed, respectively, on inner circumferential sides of the stators 14A, 14B so as to rotate relatively to the stators 14A, 14B. Cylindrical shafts 16A, 16B which surround outer circumferences of the axles 10A, 10B are connected to inner circumferential portions of the rotors 15A, 15B, respectively, and the cylindrical shafts 16A, 16B are supported in end walls 17A, 17B of the side cases 11A, 11B and the partition walls 18A, 18B via bearings 19A, 19B in a manner permitting relative rotation respectively coaxial to the axles 10A and 10B. Namely, in this embodiment, the power transmission path between the first motor 2A and the first planetary gear type speed reducer 12A has a hollow structure by the cylindrical shaft 16A, and the axle 10A which constitutes the power transmission path between the first planetary gear type speed reducer 12A and the left rear wheel LWr is inserted through an inside of the hollow structure. Similarly, the power transmission path between the second motor 2B and the second planetary gear type speed reducer 12B has an another hollow structure by the cylindrical shaft 16B, and the axle 10B which constitutes the power transmission path between the second planetary gear type speed reducer 12B and the right rear wheel RWr is inserted through a inside of the another hollow structure. Additionally, resolvers 20A, 20B, which are configured to feed back information on rotational positions of the rotors 15A, 15B to a controller (not shown) which controls the motors 2A, 2B, are provided on outer circumferences of ends of the cylindrical shafts 16A, 16B and on the end walls 17A, 17B.

The first and second planetary gear type speed reducers 12A, 12B include sun gears 21A, 21B, a plurality of planetary gears 22A, 22B which mesh with the sun gears 21, planetary carriers 23A, 23B which support the planetary gears 22A, 22B, and ring gears 24A, 24B which mesh with outer circumferential sides of the planetary gears 22A, 22B. Driving forces of the motors 2A, 2B are inputted from the sun gears 21A, 21B, and the driving forces which are decelerated are outputted from the axles 10A, 10B via the planetary carriers 23A, 23B.

The sun gears 21A, 21B are formed integrally on the cylindrical shafts 16A, 16B. Additionally, the planetary gears 22A, 22B are double pinions having first pinions 26A, 26B which are larger in diameter and which mesh directly with the sun gears 21A, 21B and second pinions 27A, 27B which are smaller in diameter than the first pinions 26A, 26B. The first pinions 26A, 26B and the second pinions 27A, 27B are formed integrally so as to be concentric and offset in an axial direction. The planetary gears 22A, 22B are supported on pinion shafts 32A, 32B of the planetary carriers 23A, 23B via needle bearings 31A, 31B. Axial inner end portions of the planetary carriers 23A, 23B extend radially inwards and are spline fitted on the axles 10A, 10B, whereby the planetary carriers 23A, 23B are supported on the axles 10A, 10B so as to rotate together. The planetary carriers 23A, 23B are also supported in the partition walls 18A, 18B via bearings 33A, 33B.

The ring gears 24A, 24B include gear portions 28A, 28B which mesh with the second pinion gears 27A, 27B, which are smaller in diameter, on inner circumferential surfaces thereof, small diameter portions 29A, 29B which are smaller in diameter than the gear portions 28A, 28B and which are disposed opposite to each other in a middle position of the case 11, and connecting portions 30A, 30B which connect axial inner end portions of the gear portions 28A, 28B and axial outer end portions of the small diameter portions 29A, 29B together in a radial direction.

The gear portions 28A, 28B face each other in the axial direction in such a way as to sandwich the third cylindrical wall 46 which is formed at a radially inner end portion of the left-right separating wall 45 of the central case 11M therebetween. The small diameter portions 29A, 29B spline fit in inner races 51 of a one-way clutch 50, which will be described later, on outer circumferential surfaces thereof, and the ring gears 24A, 24B are connected to each other so as to rotate together with the inner races 51 of the one-way clutch 50.

A hydraulic brake 60 which constitutes a brake unit for the ring gear 24B is disposed on the planetary gear type speed reducer 12B side and between the second cylindrical wall 44 of the central case 11M which constitutes the case 11 and the gear portion 28B of the ring gear 24B in such a way as to overlap the first pinion 26B in the radial direction and to overlap the second pinion 27B in the axial direction. In the hydraulic brake 60, a plurality of fixed plates 35 which are spline fitted in an inner circumferential surface of the second cylindrical wall 44 and a plurality of rotational plates 36 which are spline fitted on an outer circumferential surface of the gear portion 28B are disposed alternately in the axial direction, and these plates 35, 36 are engaged and released by an annular piston 37. The piston 37 is housed in an annular cylinder chamber which is defined between the left-right separating wall 45 and the third cylindrical wall 46 of the central case 11M so as to reciprocate freely therein. The piston 37 is biased in a direction in which the fixed plates 35 and the rotational plates 36 are released from each other at all times by an elastic member 39 which is supported a bearing seat 38 which is provided on an outer circumferential surface of the third cylindrical wall 46.

To describe in greater detail, a space defined between the left-right separating wall 45 and the piston 37 is made into a working chamber S into which the oil is directly introduced. When the pressure of the oil which is introduced into the working chamber S overcomes the biasing force of the elastic member 39, the piston 37 moves forwards (rightwards), and the fixed plates 35 and the rotational plates 36 are pressed against each other for engagement. On the other hand, when the biasing force of the elastic member 39 overcomes the pressure of the oil which is introduced into the working chamber S, the piston 37 moves backwards (leftwards), and the fixed plates 35 and the rotational plates 36 are separated from each other for release. The hydraulic brake 60 is connected to an oil pump 70.

In the case of this hydraulic brake 60, the fixed plates 35 are supported on the second cylindrical wall 44 which extends from the left-right separating wall 45 of the central case 11M, and the rotational plates 36 are supported on the gear portion 28B of the ring gear 24. Therefore, when both the plates 35, 36 are pressed against each other by the piston 37, the plates 35, 36 are frictionally fastened together, and a braking force acts on the ring gear 24B, whereby the ring gear 24B is fixed. When the engagement by the piston 37 is released from that state, the ring gear 24B is permitted to rotate freely. Since the ring gears 24A, 24B are connected to each other as described above, when the hydraulic brake 60 is applied, the braking force also acts on the ring gear 24 and fixes the ring gear 24A. When the hydraulic brake 60 is released, the ring gear 24A is also permitted to rotate freely.

A space portion is also ensured between the connecting portions 30A, 30B of the ring gears 24A, 24B which are disposed opposite to each other in the axial direction. The one-way clutch 50 is disposed within the space portion, the one-way clutch 50 being configured to transmit power to the ring gears 24A, 24B only in one direction and to cut off power acting in the other direction. The one-way clutch 50 is constructed such that a large number of sprags 53 are interposed between the inner race 51 and the outer race 52, and the inner race 51 rotates together with the small diameter portions 29A, 29B of the ring gears 24A, 24B through spline fitting. In addition, the outer race 52 is positioned by the third cylindrical wall 46 and is prevented from rotating thereby.

The one-way clutch 50 is engaged to lock the rotation of the ring gears 24A, 24B when the vehicle 3 travels forwards by the power of the motors 2A, 2B. To describe this in greater detail, the one-way clutch 50 is engaged when the rotational power of the motors 2A, 2B in a forward direction (a rotational direction when the vehicle 3 is caused to travel forwards) is inputted into the wheels Wr, while the one-way clutch 50 is disengaged when the rotational power of the motors 2A, 2B in a reverse direction is inputted into the wheels Wr. The one-way clutch 50 is disengaged when the rotational power of the wheels Wr in the forward direction is inputted into the motors 2A, 2B, while the one-way clutch 50 is engaged when the rotational power of the wheels Wr in the reverse direction is inputted into the motors 2A, 2B.

In the rear wheel driving system 1 of this embodiment that is configured as has been described heretofore, the one-way clutch 50 and the hydraulic brake 60 are disposed in parallel on the power transmission path between the motors 2A, 2B and the wheels Wr. Here, the hydraulic brake 60 is controlled between a released state, the weakly applied state, and a applied state by using the pressure of oil supplied from an oil pump 70 in accordance with the traveling state of the vehicle and the engagement or disengagement state of the one-way clutch 50. For example, when the vehicle 3 travels forwards (at low vehicle speeds or middle vehicle speeds) by the power driving of the motors 2A, 2B, the one-way clutch 50 is engaged so that a power-transmission permitted state is realized. In addition, the hydraulic brake 60 is controlled to be the weakly applied state, and therefore even though the one-way clutch 50 is disengaged as a result of the input of the forward rotational power from the motors 2A, 2B being reduced temporarily, it is possible to suppress the occurrence of a risk such that power is not transmitted between the motors 2A, 2B and the wheels Wr. Additionally, when the vehicle 3 travels forwards by the power driving of the internal combustion engine 4 and/or the motor 5 (at high vehicle speeds), the one-way clutch 50 is disengaged, and the hydraulic brake 60 is controlled to be the released state, whereby it is possible to prevent the excessive rotation of the motors 2A, 2B. On the other hand, when the vehicle 3 is reversed or is decelerated while regenerating energy, the one-way clutch 50 is disengaged, and therefore, the hydraulic brake 60 is controlled to be the applied state, whereby the reverse rotational power is outputted to the wheels Wr from the motors 2A, 2B, or the forward rotational power of the rear wheels Wr are inputted into the motors 2A, 2B.

Figure 4:
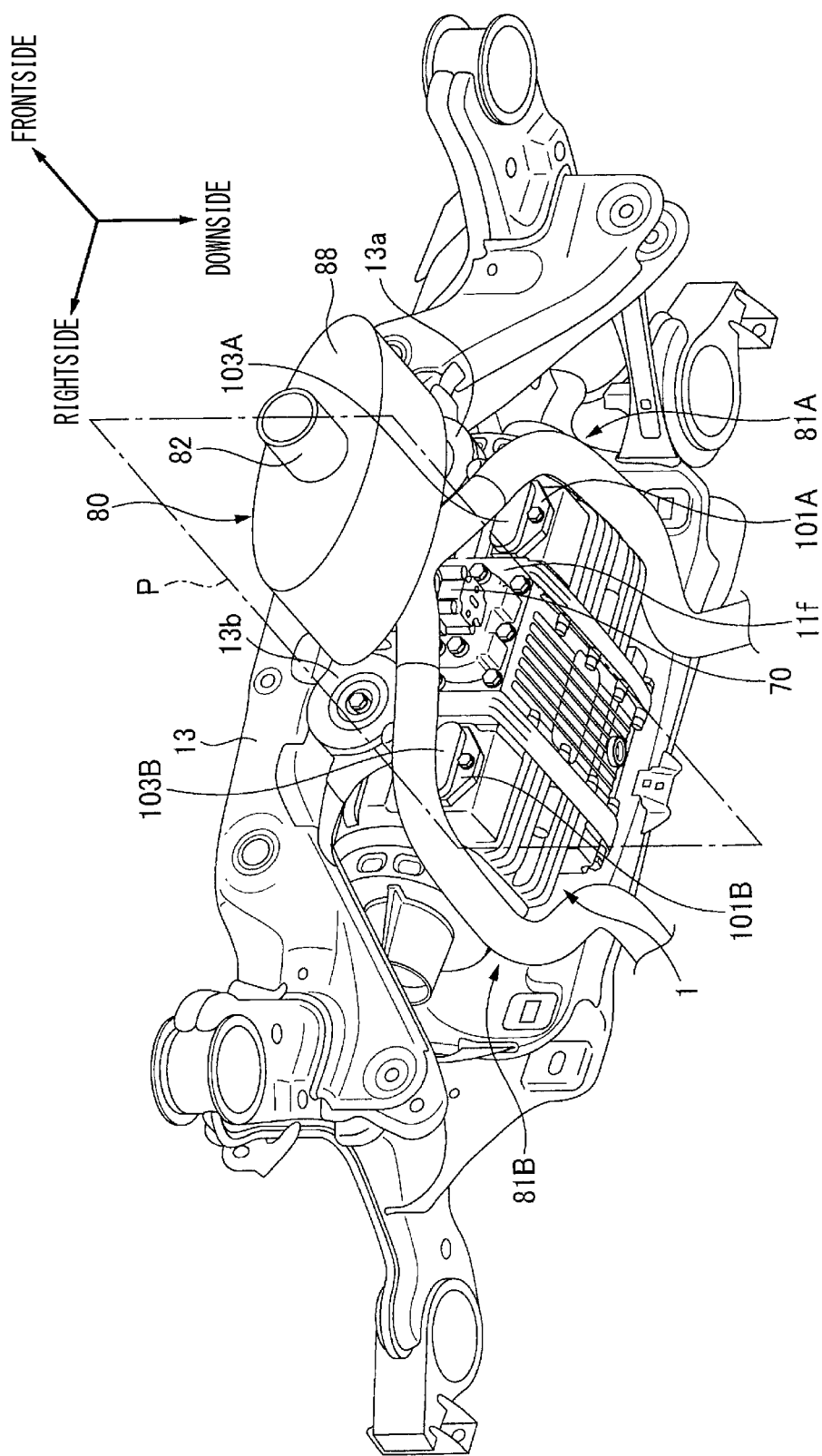
FIG. 4 is a perspective view of the rear wheel driving system as seen obliquely from front side and lower side.
Figure 5:
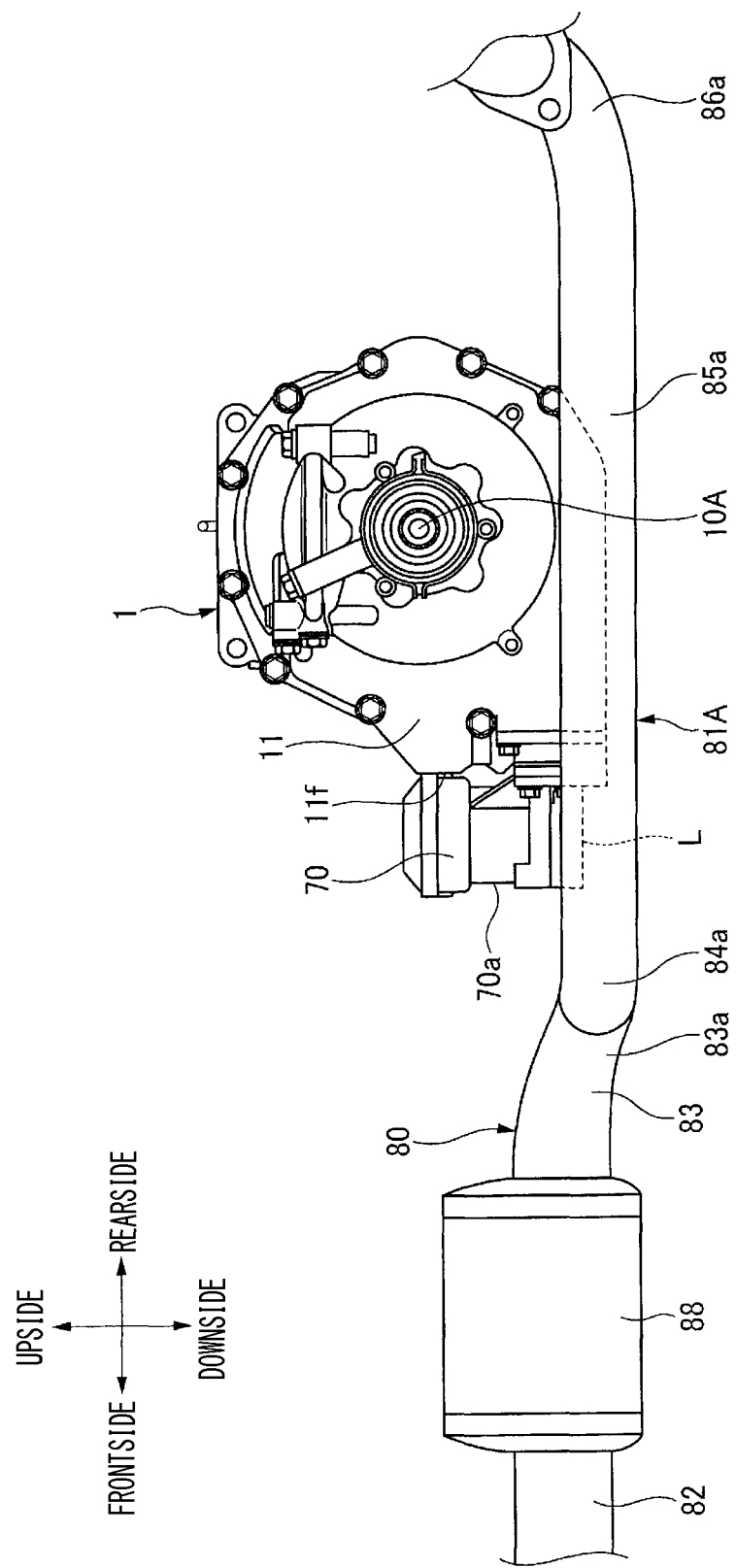
FIG. 5 is a left side view showing the arrangement of an exhaust passageway and the rear wheel driving system.

The oil pump 70, which is one of accessories, is fixed to a front side surface 11*f* of the central case 11M (refer to FIGS. 4, 5). The oil pump 70 is, for example, a trochoidal pump and is an electric oil pump which is electrically driven by a motor, not shown, such as a position sensor-less and brushless direct current motor or the like. The oil pump 70 sucks out the oil reserved in the left and right reservoir portions RL, RR to lubricate and cool various portions with the oil via lubrication flow paths 71A, 71B which are provided in various mechanism parts such as the case 11 and the axles 10A, 10B. A surface of the oil pump 70 which is directed to the front side in relation to the front-rear direction, that is, a front surface 70a has a plane which is perpendicular to the front-rear direction.

In addition, as shown in FIG. 4, the rear wheel driving system 1 is supported on a sub-frame 13 by mount members 13a, 13b and is fixed below a floor panel (not shown) of the vehicle 3 via the sub-frame 13. Additionally, also referring to FIG. 7, a first and a second connectors 101A, 101B are provided on front side surfaces 11f of the left side case 11A and the right side case 11B, respectively, for electrical connection of three-phase wires of stator coils which are wound around the stators 14A, 14B with conductive cables 103A, 103B which extend from external equipment which is not shown.

Further, as shown in FIG. 1, an exhaust passageway 80 through which exhaust gas of the internal combustion engine 4 passes is connected to the internal combustion engine 4 at one end portion and extends to the rear side of the vehicle in the front-rear direction thereof and thereafter branches into left and right portions which pass along both sides of the rear wheel driving system 1. Namely, as shown in FIGS. 4 to 7, the exhaust passageway 80 has a common passageway 82 which is connected to the internal combustion engine 4 at one end thereof and which extends to the rear side of the vehicle, a branch passageway 83 which is connected to the common passageway 82 and where the exhaust passageway 80 branches into left and right directions, a first exhaust passageway 81A and a second exhaust passageway 81B which is branched off at the branch passageway 83 and which extends to the rear side, and a diameter-expanded portion 88 which is provided halfway along the common passageway 82 and where the exhaust passageway 80 is expanded radially. In this embodiment, the diameter-expanded portion 88 is provided at the other end of a pipe which constitutes the common passageway 82 and is connected to a pipe which constitutes the branch passageway 83.

Additionally, in this embodiment, the common passageway 82, the diameter-expanded portion 88 and a common passageway 83c of the branch passageway 83 which is located before the branch passageway 83 branches into the first and second branch passageways 83a, 83b constitute a common portion 89 of the invention.

The first exhaust passageway 81A passes through a far side of the first motor 2A in relation to the second motor 2B in the alignment direction of the first and second motors 2A, 2B, and the second exhaust passageway 81B passes through a far side of the second motor 2B in relation to the first motor 2A in the alignment direction. Additionally, the common portion 89 is disposed at end portions of the first exhaust passageway 81A and the second exhaust passageway 81B in a position which intersects with an imaginary plane P and forms a common flow path to the first and second exhaust passageways 81A, 81B.

The exhaust passageway 80 configured as described above is disposed so as to surround four circumferential surfaces of the case 11. Namely, the exhaust passageway 80 is disposed so as to surround a first plane S1 which passes through a front end of the case 11 and which is perpendicular to the front-rear direction of the vehicle 3, a second plane S2 which passes through a rear end of the case 11 and which is perpendicular to the front-rear direction of the vehicle 3, a third plane S3 which passes through a left end of the case 11 and which is perpendicular to the left-right direction of the vehicle 3, and a fourth plane S4 which passes through a right end of the case 11 and which is perpendicular to the left-right direction of the vehicle 3.

Specifically, the first exhaust passageway 81A has an outwardly extending portion 84a which extends outwards in the left-right direction continuously from the first branch passageway 83a of the branch passageway 83 and which faces the first plane S1, an axially extending portion 85a which extends to the rear side from the outwardly extending portion 84a and which faces the third plane S3, an inwardly extending portion 86a which extends inwards in the left-right direction as it extends to the rear side from the axially extending portion 85a and which faces the second plane S2, and a curved portion 87a which is curved further outwards in the left-right direction from the inwardly extending portion 86a. Thus, the first exhaust passageway 81A passes through the left side of the rear wheel driving system 1 and extends to the rear side.

Additionally, the second exhaust passageway 81B also has an outwardly extending portion 84b which extends outwards in the left-right direction continuously from the second branch passageway 83b of the branch passageway 83 and which faces the first plane S1, an axially extending portion 85b which extends to the rear side from the outwardly extending portion 84b and which faces the fourth plane S4, an inwardly extending portion 86b which extends inwards in the left-right direction as it extends to the rear side from the axially extending portion 85b and which faces the second plane S2, and a curved portion 87b which is curved further outwards in the left-right direction from the inwardly extending portion 86b. Thus, the second exhaust passageway 81a passes through the right side of the rear wheel driving system 1 and extends to the rear side.

By this configuration, the case 11 can be warmed up from four sides thereof by the heat of the exhaust passageway 80, whereby the temperatures of the first and second motors 2A, 2B which are housed in the case 11 can be raised. Additionally, the first exhaust passageway 81A and the second exhaust passageway 81B are disposed on the first motor side and the second motor side of the rear wheel driving system 1 in a parallel manner, and therefore, the case 11 can be warmed up while reducing the difference in the heat receiving amount between the first motor 2A and the second motor 2B in the alignment direction of the first and second motors 2A, 2B.

Further, the first exhaust passageway 81A and the second exhaust passageway 81B include the common portion 89 at their ends located nearer to the internal combustion engine 4, and therefore, the heat receiving amount of the first and second motors 2A, 2B can be made even.

The exhaust passageway 80 is disposed so as to ensure a gap between the case 11 and itself along the entire length thereof to thereby prevent the overheat of the first and second motors 2A, 2B which would otherwise be caused when the rear wheel driving system 1 receives the excessive heat.

In addition, the common passageway 82, the branch passageway 83 and the diameter-expanded portion 88 are disposed further forwards in the front-rear direction than the oil pump 70 which is fixed to the rear wheel driving system 1, that is, are disposed further forwards than the front surface 70a of the oil pump 70. Consequently, the common passageway 82, the diameter-expanded portion 88 and the branch passageway 83 which constitute the common portion 89 of the exhaust passageway 80, the oil pump 70 and the rear wheel driving system 1 are disposed sequentially in this order from the front side, and the branch passageway 83 of the exhaust passageway 80 and the front surface 70a of the oil pump 70 are disposed so as to be opposite to each other.

Figure 6:
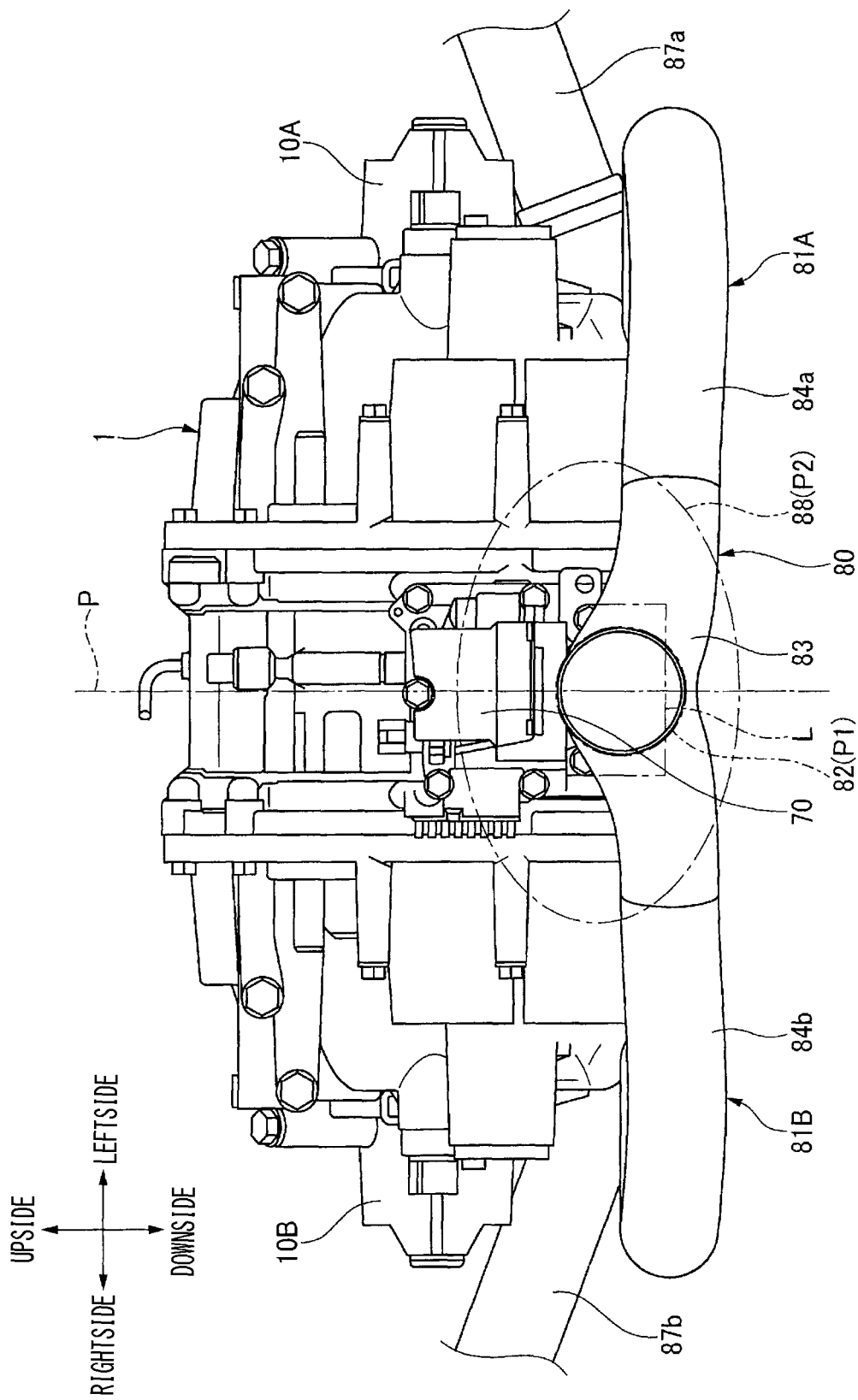
FIG. 6 is a front view showing the arrangement of the exhaust passageway and the rear wheel driving system.

Then, the oil pump 70 is disposed in a rear horizontal projection area P1 of the common portion 89 and is also disposed in a rear horizontal projection area P2 of the diameter-expanded portion 88, as shown in FIG. 6. Namely, when seen from the front side, the oil pump 70 is disposed so that at least part of the oil pump 70 is put in shade by the common passageway 82, the common flow path 83c of the branch passageway 83 and the diameter-expanded portion 88. Additionally, by this arrangement, the oil pump 70 is disposed so as to intersect with the imaginary plane P extending in the front-rear direction and passing through the common flow path 82 (the common portion 89), as shown in FIG. 6.

Additionally, as shown in FIG. 5, the branch passageway 83 of the exhaust passageway 80 which is positioned further forwards than the oil pump 70 is inclined in relation to the front-rear direction so that a near end (rear side) portion to the oil pump 70 is positioned further vertically downwards than a far end (front side) from the oil pump 70. Because of this, the first and second branch passageways 83a, 83b of the branch passageway 83 and the outwardly extending portions 84a, 84b of the first and second exhaust passageways 81A, 81B are positioned further downwards than the vertically lowermost surface L of the oil pump 70 in a position which is further forwards than the oil pump 70.

Figure 7:
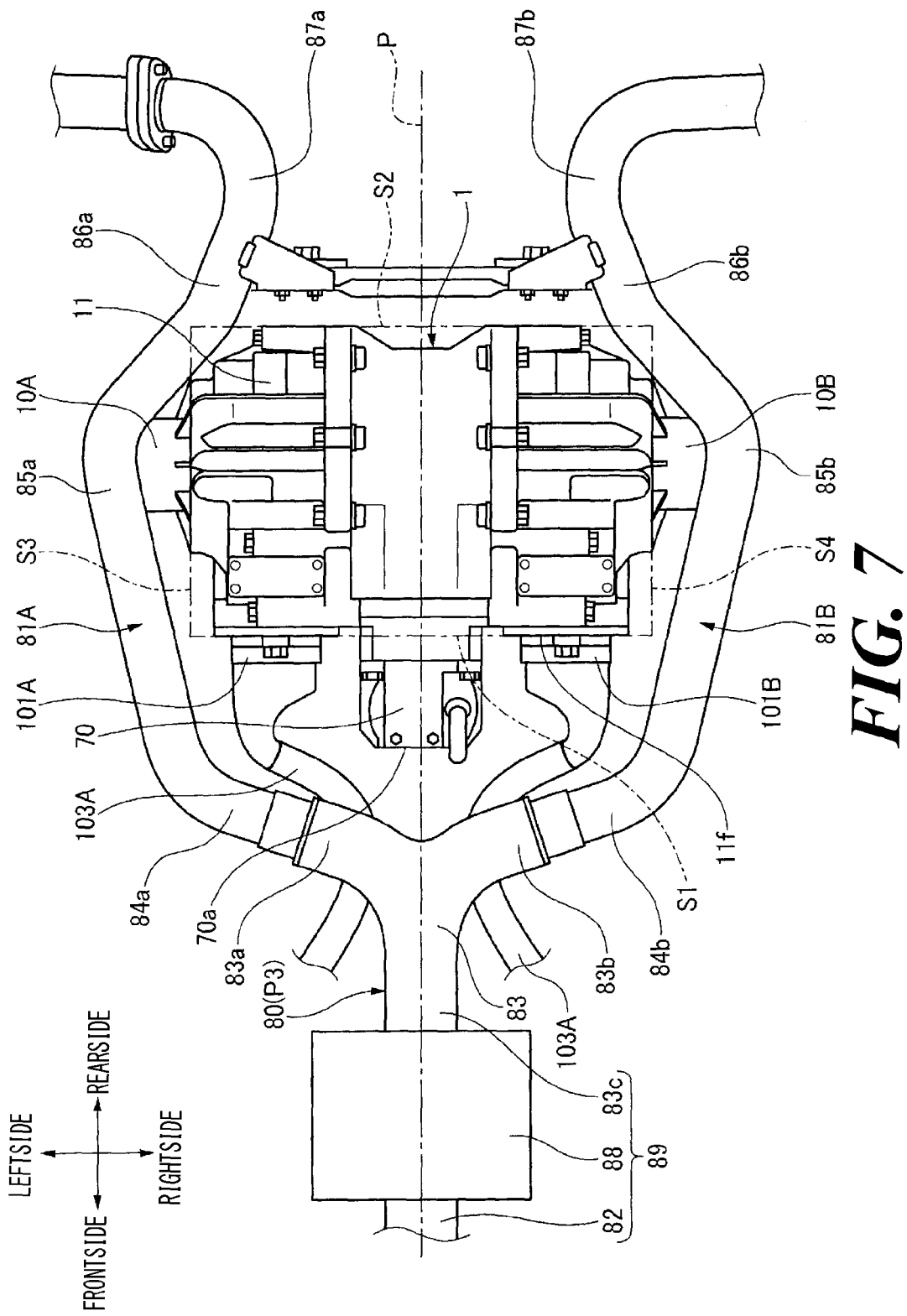
FIG. 7 is a bottom view showing the arrangement of the rear wheel driving system and the exhaust passageway.

Additionally, as shown in FIG. 7, the oil pump 70 is disposed so as not to overlap the upper vertical projection area P3 of the exhaust passageway 80. The oil pump 70 is disposed opposite to the exhaust passageway 80 in such a way as to be spaced away from the exhaust passageway 80 by such a distance that the heat of exhaust gas which passes through the inside of the exhaust passageway 80 can be transmitted to the oil pump 70, and is fixed to the front side surface 11f of the rear wheel driving system 1.

By this configuration, as shown in FIGS. 4 to 7, while the vehicle 3 is running, the running air accompanied with the running of the vehicle 3 flows from the front side to the rear side of the vehicle 3 to cool the rear wheel driving system 1 and the like. Additionally, since the oil pump 70 is disposed in the rear horizontal projection area P2 of the diameter-expanded portion 88 in addition to the rear horizontal projection area P1 of the common portion 89, it is suppressed that the running air from the front side which is further forwards than the exhaust passageway 80 hits the oil pump 70. On the other hand, the running air which is warmed up by the heat of the common portion 89 and the diameter-expanded portion 88 and which flows to the rear side hits the oil pump 70 to thereby raise the temperature of the oil pump 70. Consequently, the viscosity of the oil flowing in the inside of the oil pump 70 is lowered to thereby reduce the resistance of the oil pump 70, thereby making it possible to enhance the fuel economy performance of the vehicle 3.

In addition, since the flow velocity of exhaust gas which passes through the branch passageway 83 is slowed at the branch passageway 83, heat tends to be accumulated in the branch passageway 83, and more heat can be emitted therefrom, whereby the oil pump 70 can be warmed up more effectively.

While the vehicle 3 is stopped, since air around the exhaust passageway 80 which is warmed up by the exhaust passageway 80 flows vertically upwards, the oil pump 70 which is disposed so as not to overlap the upper vertical projection area P3 of the exhaust passageway 80 is never warmed up by the air, whereby the overheat of the oil pump 70 is prevented.

Thus, as has been described heretofore, according to the hybrid vehicle 3 of this embodiment, the vehicle 3 has the internal combustion engine 4 and the rear wheel driving system 1 which has the exhaust passageway 80 through which exhaust gas of the internal combustion engine 4 passes, the first and second motors 2A, 2B which are connected to the left and right rear wheels LWr, RWr in a power transmissive manner, and the case 11 which houses the first and second motors 2A, 2B and which is disposed to be spaced away from the internal combustion engine 4. Then, the rear wheel driving system 1 is disposed further rearwards than the internal combustion engine 4 in the front-rear direction of the vehicle 3. The exhaust passageway 80 extends from the internal combustion engine 4 towards the rear side of the vehicle 3 and is disposed so as to surround the first plane S1 which passes through the front end of the case 11 and which is perpendicular to the front-rear direction of the vehicle, the second plane S2 which passes through the rear end of the case 11 and which is perpendicular to the front-rear direction of the vehicle 3, the third plane S3 which passes through the left end of the case 11 and which is perpendicular to the left-right direction of the vehicle 3, and the fourth plane S4 which passes through the right end of the case 11 and which is perpendicular to the left-right direction of the vehicle 3. This enables the case 11 to be warmed up from the four sides thereof by the heat of the exhaust passageway 80, whereby the temperatures of the first and second motors 2A, 2B which are housed in the case 11 can be raised.

Additionally, the exhaust passageway 80 is connected to the internal combustion engine 4 at the one end portion thereof and includes the first exhaust passageway 81A which passes through the far side of the first motor 2A in relation to the second motor 2B in the alignment direction of the first and second motors 2A, 2B and the second exhaust passageway 81B which passes through the far side of the second motor 2B in relation to the first motor 2A in the alignment direction. Consequently, the first exhaust passageway 81A and the second exhaust passageway 81B are disposed parallel on the first motor side and the second motor side of the rear wheel driving system 1, and therefore, in comparison with a situation where the first exhaust passageway 81A and the second exhaust passageway 81B are disposed in series on the first motor side and the second motor side of the rear wheel driving system 1, the case 11 can be warmed up while reducing the difference in the heat receiving amount between the first motor and the second motor in the alignment direction.

Further, the first exhaust passageway 81A and the second exhaust passageway 81B include the common portion 89 where the first and second exhaust passageways form the common flow path which are situated nearer to the internal combustion engine 4 than to the first plane S1. The common portion 89 is disposed in the position where the common portion 89 intersects with the imaginary plane P which is perpendicular to the alignment direction and which is positioned at an equal distance from the first and second motors 2A, 2B. Consequently, since the common portion 89 is disposed at the equal distance from the first and second motors 2A, 2B and nearer to the internal combustion engine 4 than to the first and second motors 2A, 2B, the heat receiving amount of the first and second motors 2A, 2B can be made even.

In addition, the oil pump 70 which is disposed on the front side surface 11f of the rear wheel driving system 1 which can receive the heat from the exhaust passageway 80 is disposed in the rear horizontal projection area P1 of the common portion 89. Therefore, while the vehicle is running, the running air which is warmed up by the heat of the exhaust passageway 80 flows to the rear side to hit the oil pump 70 to thereby raise the temperature of the oil pump 70 effectively. On the other hand, while the vehicle is stopped, since the heat of the exhaust passageway 80 rises vertically upwards, it is possible to prevent the excessive heat from transmitting to the oil pump 70.

Further, since the exhaust passageway 80, the oil pump 70 and the rear wheel driving system 1 are disposed sequentially in this order from the front side in the front-rear direction, the rear wheel driving system 1 is not disposed in front side of the oil pump 70, whereby it is possible to prevent the occurrence of a situation in which the rear wheel driving system 1 cuts off the heat from the exhaust passageway 80 and the raising of the temperature of the oil pump 70 is disturbed.

Since the exhaust passageway 80 and the front surface 70a of the oil pump 70 is disposed opposite to each other without other members interposed therebetween, the heat of the passageway 80 is not cut off by the other members, whereby the heat of the exhaust passageway 80 can be transmitted to the oil pump 70.

In at least part of the exhaust passageway 80 which is positioned further forwards than the front surface 70a of the oil pump 70 in the front-rear direction, the lower surface thereof is disposed further downwards than the vertically lowermost surface L of the oil pump 70. Therefore, while the vehicle is running, the running air which is warmed up by the heat of the exhaust passageway 80 rises while flowing to the rear side. Consequently, in comparison with a situation where the lower surface of the exhaust passageway 80 is disposed further upwards than the vertically lowermost surface L of the oil pump 70, the portion where the heat of the oil pump 70 can be received is increased, thereby making it possible to warm up the whole of the oil pump 70 with good efficiency.

The branch passageway 83 of the exhaust passageway 80 is formed to be inclined so that the end nearer to the oil pump 70 is disposed further vertically downwards than the end nearer to the internal combustion engine 4, and therefore, in comparison with a situation where the exhaust passageway 80 is formed horizontal, the rear horizontal projection area P1 of the exhaust passageway 80 can be increased. Additionally, in comparison with a situation where the exhaust passageway 80 is formed to be inclined so that the end far from the oil pump 70 is disposed further downwards than the end nearer to the oil pump 70, the oil pump 70 can receive more of the running air that is warmed up by the exhaust passageway 80 to rise from the lower side thereof, whereby the temperature of the oil pump 70 can be raised with good efficiency.

The front surface 70a of the oil pump 70 has the plane which is perpendicular to the front-rear direction, and therefore, the running air that is warmed up by the exhaust passageway 80 hits the front surface 70a of the oil pump 70 in an ensured manner, whereby the raising of the temperature of the oil pump 70 can be executed in a more ensured manner.

The oil pump 70 is disposed in the rear horizontal projection area P2 of the diameter-expanded portion 88 in addition to the rear horizontal projection area P1 of the exhaust passageway 80, and therefore, the oil pump 70 can be warmed up by the heat of both the exhaust passageway 80 and the diameter-expanded portion 88. Additionally, the running air is cut off by the diameter-expanded portion 88, and therefore, there is no such a situation that the running air hits directly the oil pump 70.

The oil pump 70 is disposed outside the upper vertical projection area of the exhaust passageway 80, and the oil pump 70 is not disposed above the exhaust passageway 80. Therefore, there is no such a situation that the heat rising vertically upwards from the exhaust passageway 80 while the vehicle is stopped hits the oil pump 70. Consequently, it is prevented that the oil pump 70 is overheated to thereby reduce the viscosity of the oil therein extremely low while the vehicle is stopped.

Since the oil pump 70 is the electric oil pump which is driven electrically, there is no such a situation that the oil pump 70 is heated directly while the vehicle is stopped, whereby it is possible to prevent the reduction in performance of the motor of the oil pump 70.

In addition, since the internal combustion engine 4 is disposed in the position where it intersects with the imaginary plane P, that is, is disposed on the central dividing plane of the rear wheel driving system 1, the lengths of the first and second exhaust passageways 81A, 81B can be made substantially the same, whereby the heat receiving amount of the first and second motors 2A, 2B can be made even.

Additionally, the rear wheel driving system 1 includes further the first and second planetary gear type speed reducers 12A, 12B in addition to the first and second motors 2A, 2B. The first motor 2A and the first planetary gear type speed reducer 12A are connected to the left rear wheel LWr of the vehicle 3 in a power transmissive manner, and the second motor 2B and the second planetary gear type speed reducer 12B are connected to the right rear wheel RWr of the vehicle 3 in a power transmissive manner. The first motor 2A is disposed on the lef side in the left-right direction, and the second motor 2B is disposed on the right side in the left-right direction. The first and second planetary gear type speed reducers 12A, 12B are disposed inside the first and second motors 2A, 2B in the left-right direction. Namely, since the first and second motors 2A, 2B are disposed side by side in the left-right direction, in comparison with a situation where the first and second motors 2A, 2B are disposed side by side in the front-rear direction, it is possible to suppress the difference in the heat receiving amount of the first and second motors 2A, 2B to a low level, whereby the first and second motors 2A, 2B can receive the heat evenly.

In general, the motors 2A, 2B have more elements per unit space than the planetary gear type speed reducers 12A, 12B. In this embodiment, the motors 2A, 2B which have more elements per unit space are disposed further outwards in the left-right direction, and therefore, the first and second motors 2A, 2B can receive the heat from the exhaust passageway 80 efficiently.

Further, the respective rotational axes of the first motor 2A, the first planetary gear type speed reducer 12A, the second motor 2B and the second planetary gear type speed reducer 12B are disposed on the same axis x. The first planetary gear type speed reducer 12A is disposed on the power transmission path between the first motor 2A and the left rear wheel LWr, and the second planetary gear type speed reducer 12B is disposed on the power transmission path between the second motor 2B and the right rear wheel RWr. The power transmission path between the first motor 2A and the first planetary gear type speed reducer 12A has the hollow structure due to the cylindrical shaft 16A, and the axle 10A which constitutes the power transmission path between the first planetary gear type speed reducer 12A and the left rear wheel LWr is inserted through the inside of the hollow structure. In addition, the power transmission path between the second motor 2B and the second planetary gear type speed reducer 12B has another hollow structure due to the cylindrical shaft 16B, and the axle 10B which constitutes the power transmission path between the second planetary gear type speed reducer 12B and the right rear wheel RWr is inserted through the inside of the another hollow structure. Consequently, the rotational axes of the four rotational members are made to coincide by the hollow structures, whereby it is possible to suppress the radial enlargement of the case 11. Additionally, the distances from the exhaust passageway 80 to the first and second motors 2A, 2B can be made even, and therefore, the heat receiving amount of the first and second motors 2A, 2B can be made even.

Additionally, by using the planetary gear mechanisms as the first and second planetary gear type speed reducers 12A, 12B, the large reduction gear ratio can be given in the compact configuration.

Further, the first and second planetary gear type speed reducers 12A, 12B are formed by connecting the ring gears 24A, 24B to each other, and therefore, the first and second motors 2A, 2B, which are in contact with the case 11 over a larger surface area than the speed changers 12A, 12B, are connected by the ring gears 24A, 24B of the first and second planetary gear type speed reducers 12A, 12B. This enables heat to be transmitted between the first and second motors 2A, 2B, which prevents only one of the first and second motors 2A, 2B from being overheated.

Additionally, the exhaust passageway 80 is disposed so as to ensure the gap between the case 11 and itself over the entire length thereof. Namely, the exhaust passageway 80 is never brought into contact with the rear wheel driving system 1 over the entire length thereof, whereby there exists no direct heat transmissive relationship therebetween. This prevents the overheat of the first and second motors 2A, 2B which would otherwise be caused when the rear wheel driving system 1 receives the excessive heat.

The internal combustion engine 4 is connected to the front wheels Wf of the vehicle 3 in a power transmissive manner, and the internal combustion engine 4 which is connected to the exhaust passageway 80 for warming up the case 11 constitutes the driving source of the vehicle 3. This enables the temperatures of the motors 2A, 2B to be raised by the heat of the internal combustion engine 4 which is generated when the internal combustion engine 4 generates the driving force of the vehicle 3, which obviates the necessity of disposing a separate member such as a heater or the like.

Figure 8:
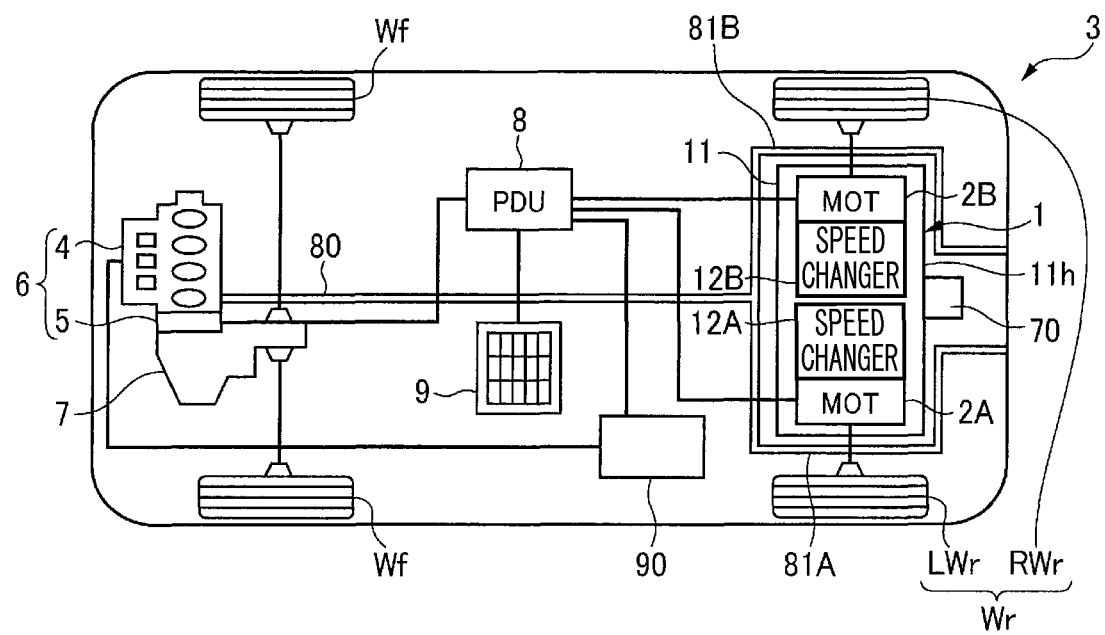
FIG. 8 is a schematic block diagram of a hybrid vehicle according to a modified example of the first embodiment.

It is desirable that the oil pump 70 is disposed, as has been described above, in a middle portion of the front side surface 11$f$ of the rear wheel driving system 1 in relation to the left-right direction such as the rear horizontal projection area P1 of the common portion 89 where more heat is emitted or the rear horizontal projection area P2 of the diameter-expanded portion 88 which occupies the large area. However, as in a modified example shown in FIG. 8, for example, an oil pump 70 may be disposed on a rear surface 11$h$ of a rear wheel driving system 1. In this case, the oil pump 70 is disposed in a rear horizontal projection area of an exhaust passageway 80 via the rear wheel driving system 1.

Also in a vehicle 3 adopting the modified example, the oil pump 70 is warmed up by running air which is heated by exhaust gas which passes through the exhaust passageway 80 while the vehicle 3 is running, and while the vehicle is stopped, the overheat of the oil pump 70 is prevented.

Second Embodiment

Figure 9:
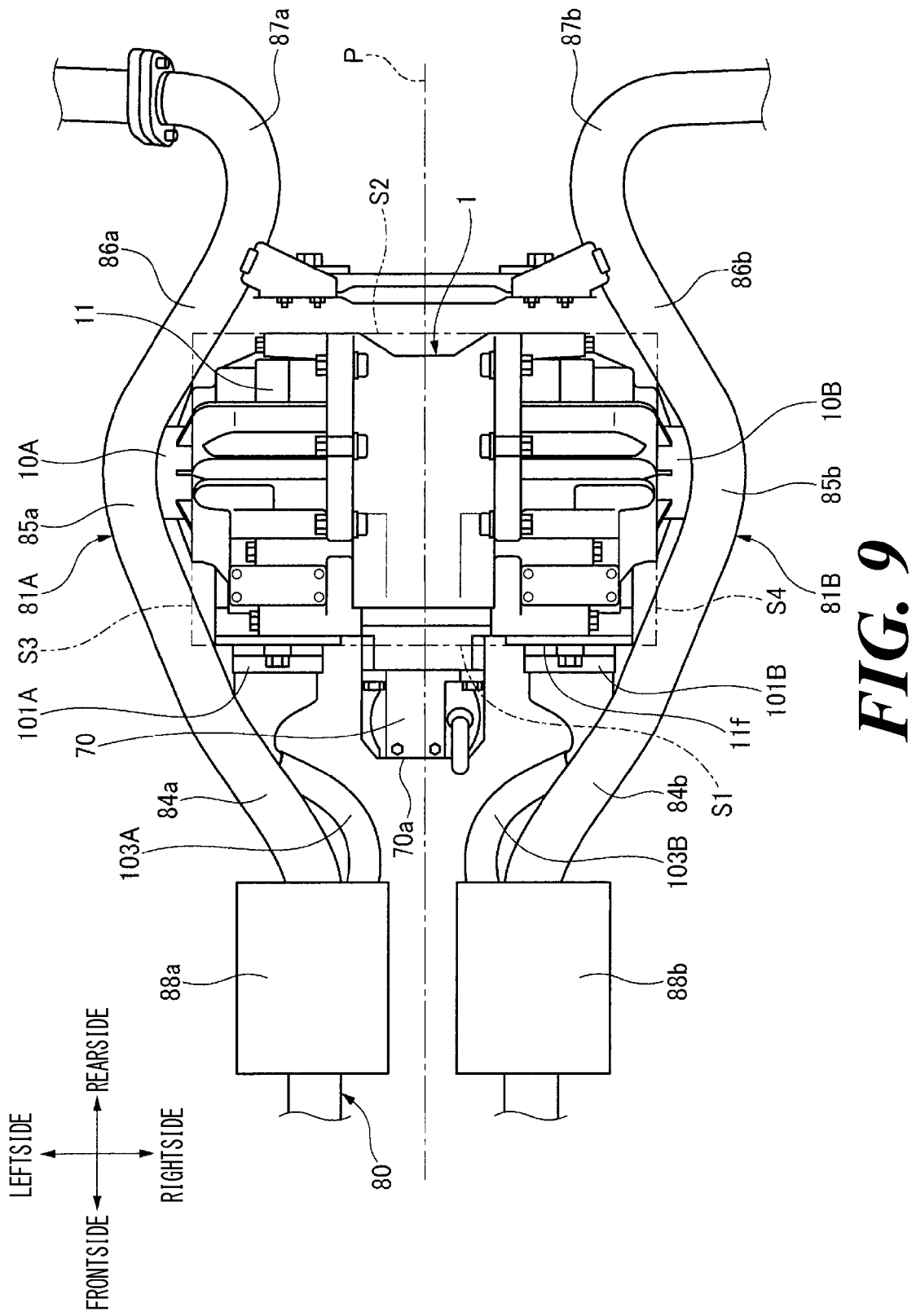
FIG. 9 is a bottom view showing the arrangement of a rear wheel driving system and an exhaust passageway of a second embodiment.

Next, a hybrid vehicle according to a second embodiment of the invention will be described by reference to FIG. 9. Like reference numerals will be given to the same or similar portions to those of the first embodiment, and the description thereof will be omitted or simplified.

An exhaust passageway 80 of this embodiment differs from that of the first embodiment in that a first exhaust passageway 81A and a second exhaust passageway 81B do not have a common passageway 82 but include their own independent diameter-expanded portions 88$a$, 88$b$ and are connected to an internal combustion engine 4 separately at end portions thereof.

Specifically speaking, the first exhaust passageway 81A has the diameter-expanded portion 88$a$, an outwardly extending portion 84$a$ which extends outwards in a left-right direction from the diameter-expanded portion 88$a$, an axial extending portion 85$a$ which extends to the rear side from the outwardly extending portion 84$a$, an inwardly extending portion 86$a$ which extends inwards in the left-right direction as it extends to the rear side from the axial extending portion 85$a$, and a curved portion 87$a$ which is curved further outwards in the left-right direction from the inwardly extending portion 86$a$, and passes through the left side of a rear wheel driving system 1 to extend to the rear side.

Additionally, the second exhaust passageway 81B has the diameter-expanded portion 88$b$, an outwardly extending portion 84$b$ which extends outwards in the left-right direction from the diameter-expanded portion 88$b$, an axial extending portion 85$b$ which extends to the rear side from the outwardly extending portion 84$b$, an inwardly extending portion 86$b$ which extends inwards in the left-right direction as it extends to the rear side from the axial extending portion 85$b$, and a curved portion 87$b$ which is curved further outwards in the left-right direction from the inwardly extending portion 86$b$, and passes through the right side of the rear wheel driving system 1 to extend to the rear side.

By this configuration, the exhaust passageway 80 of this embodiment is also disposed so as to surround a first plane S1 which passes through a front end of a case 11 and which is perpendicular to a front-rear direction of the vehicle 3, a second plane S2 which passes through a rear end of the case 11 and which is perpendicular to the front-rear direction of the vehicle 3, a third plane S3 which passes through a left end of the case 11 and which is perpendicular to the left-right direction of the vehicle 3, and a fourth plane S4 which passes through a right end of the case 11 and which is perpendicular to the left-right direction of the vehicle 3. This enables the case 11 to be warmed up from the four sides thereof by the heat of the exhaust passageway 80, whereby the temperatures of the first and second motors 2A, 2B which are housed in the case 11 can be raised.

Other configurations and functions are the same as those of the first embodiment.

The invention is not limited to the embodiments that have been described heretofore and hence can be modified or improved as required.

In the embodiments, while the hybrid vehicle is described which has the front wheel driving system 6 which includes the internal combustion engine 4 and the motor at the front portion of the vehicle and the rear wheel driving system 1 which includes the first and second motors 2A, 2B and the first and second planetary gear type speed reducer 12A, 12B at the rear portion of the vehicle separated from the internal combustion engine 4, the invention is not limited thereto and hence can be applied to any vehicle as long as it has an internal combustion engine 4 to which an exhaust passageway 80 is connected and a driving system which is disposed away from the internal combustion engine 4 and which includes a first and second motors 2A, 2B.

Figure 10A:
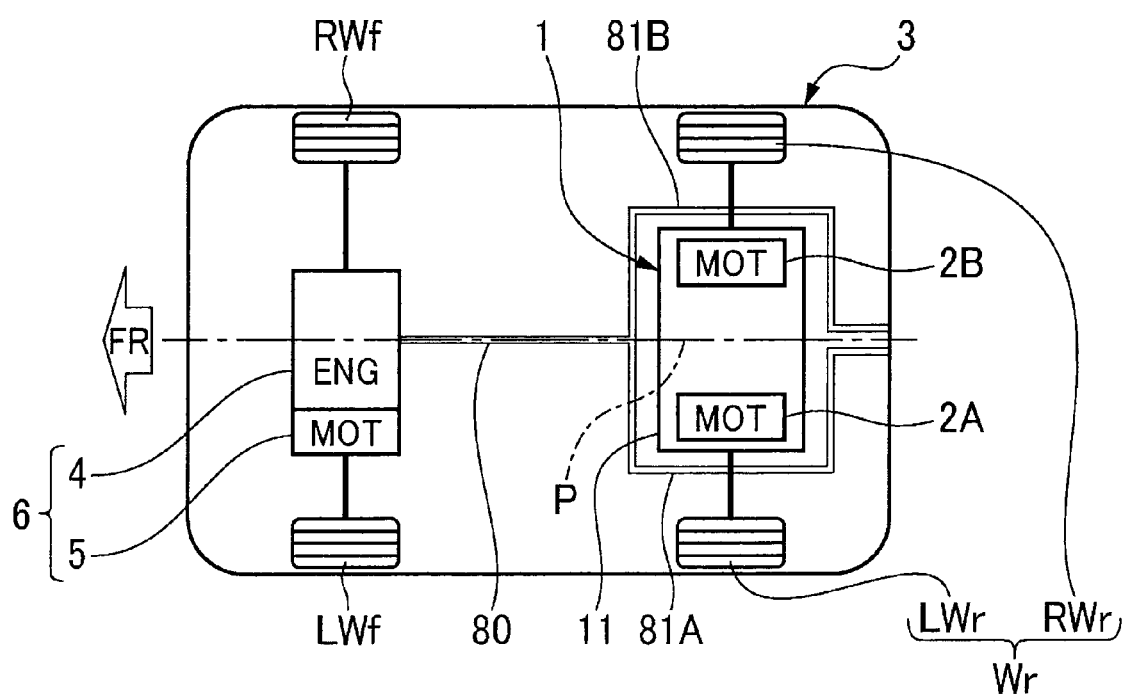
FIGS. 10A to 10C are schematic block diagrams of hybrid vehicles according to other modified examples of the invention.
Figure 10B:
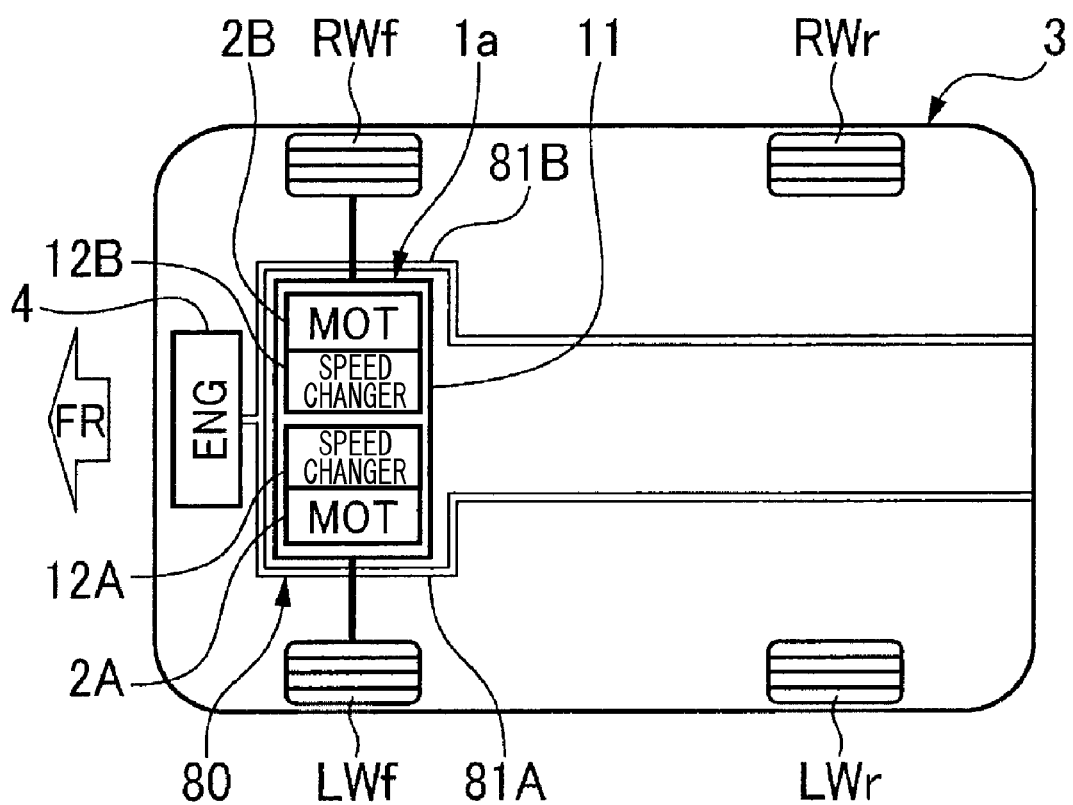
Figure 10C:
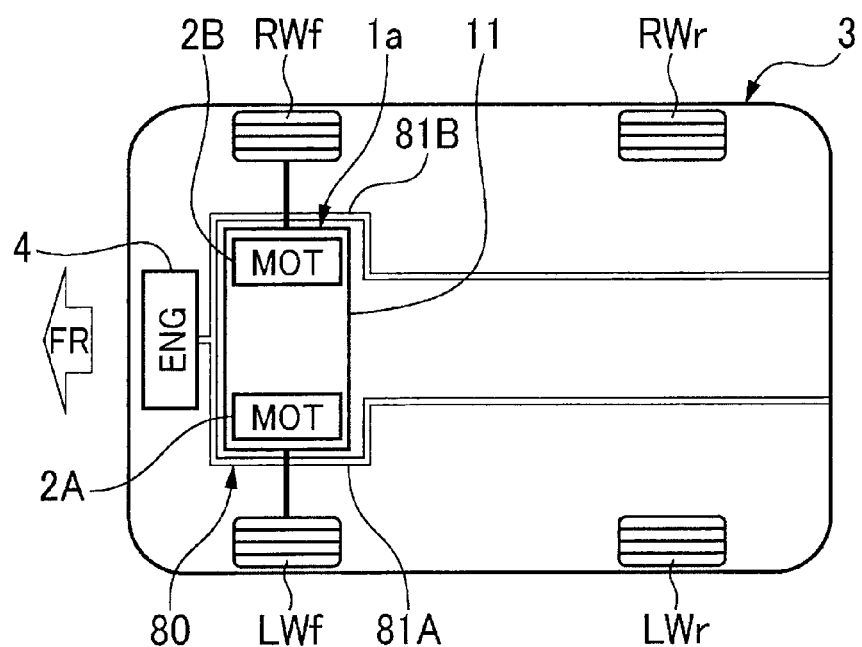
Figure 11:
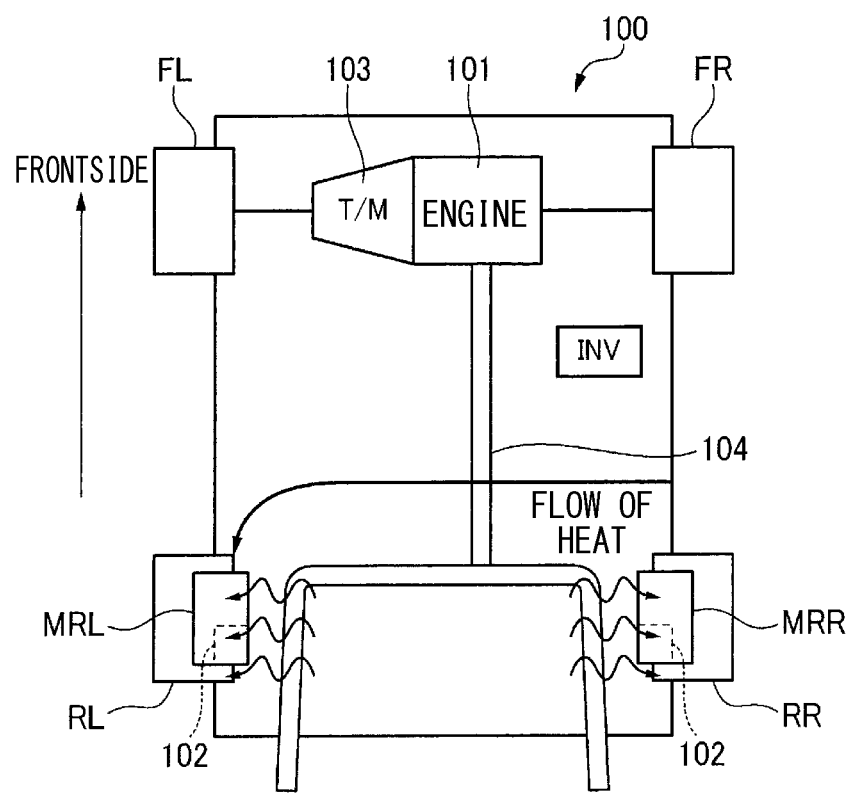
FIG. 11 is a schematic block diagram of a conventional vehicle.

For example, a rear wheel driving system 1 which is disposed at a rear portion of a vehicle may be configured as shown in FIG. 10A, in which a first and a second motors 2A, 2B are connected to a left and right rear wheels LWr, RWr in a power transmissive manner without a first and a second speed changers. Additionally, a front wheel driving system 1$a$ which has a first and a second motors 2A, 2B and a first and a second speed changers 12A, 12B may be configured as shown in FIG. 10B, in which the driving system 1$a$ is disposed at a front portion of a vehicle in such a way as to be disposed away from the internal combustion engine 4 which is disposed further forwards than the driving system 1$a$ and drives left and right front wheels LWf, RWf. Further, a front wheel driving system 1$a$ which is disposed at a front portion of a vehicle may be configured as shown in FIG. 10C, in which a first and a second motors 2A, 2B are connected to left and right front wheels LWf, RWf in a power transmissive manner without a first and a second speed changers.

In the embodiments, while the two motors 2A, 2B are housed in the single case 11, the invention is not limited thereto, and hence, the motors 2A, 2B may be housed individually in separate cases.

Further, the exhaust passageway 80 of the invention may be configured to include a catalytic converter or a muffler which is connected to an exhaust pipe, and the catalytic converter or the muffler may be configured to surround partially the first to fourth planes. The diameter-expanded portions 88, 88a, 88b are constituted by a catalytic converter.

The exhaust passageway 80 is not limited to those described in the embodiments as long as the first to fourth planes can be surrounded thereby and hence should be designed according to the shape of the housing or a lower configuration of the floor panel.

For example, in the first and second exhaust passageways 81A, 81B, the axial extending portions 85a, 85b are formed so as to protrude most near the position where they intersect with the axles 10A, 10B, that is, the axis x in the front-rear direction. However, the axial extending portions 85a, 85b may be formed into a straight line along the front-rear direction.

While the invention has been described in detail and by reference to the specific embodiments, it is obvious to those skilled in the art to which the invention pertains that various alterations or modifications can be made thereto without departing from the spirit and scope of the invention.

This patent application is based on Japanese Patent Application (No. 2012-117618) filed on May 23, 2102 and Japanese Patent Application (No. 2012-194331) filed on Sep. 4, 2012, the contents of which are incorporated herein by reference.

DESCRIPTION OF REFERENCE NUMERALS AND CHARACTERS

1 Rear wheel driving system (driving system)
1a Front wheel driving system (driving system)
2A First motor
2B Second motor
3 Hybrid vehicle
4 Internal combustion engine
11 Case (housing)
11f Front side surface (outer surface of driving system)
11h Rear surface (outer surface of driving system)
12A First planetary gear type speed reducer (first speed changer)
12B Second planetary gear type speed reducer (second speed changer)
16A, 16B Cylindrical shaft
70 Oil pump (electric oil pump)
70a Front surface of oil pump (surface of oil pump which is directed to front in front-rear direction)
80 Exhaust passageway
81A First exhaust passageway
81B Second exhaust passageway
82 Common flow path
83 Branch passageway (branch portion)
88, 88a, 88b Diameter-expanded portion
89 Common portion
L Vertically lowermost surface
P Imaginary plane
x Axis
S1 First plane
S2 Second plane
S3 Third plane
S4 Fourth plane.

The invention claimed is:

1. A hybrid vehicle comprising:
an internal combustion engine;
an exhaust passageway through which exhaust gas of the internal combustion engine passes; and
a driving system having:
a first and a second motor which are connected to wheels of the vehicle to enable to transmit power; and
a housing which houses the first and the second motors and disposed away from the internal combustion engine, wherein:
the driving system is disposed further rearwards than the internal combustion engine in a front-rear direction of the vehicle; and
the exhaust passageway extends from the internal combustion engine towards a rear side of the vehicle and is disposed so as to surround:
a first plane which passes through a front end of the housing and which is perpendicular to the front-rear direction of the vehicle;
a second plane which passes through a rear end of the housing and which is perpendicular to the front-rear direction of the vehicle;
a third plane which passes through a left end of the housing and which is perpendicular to a left-right direction of the vehicle; and
a fourth plane which passes through a right end of the housing and which is perpendicular to the left-right direction of the vehicle.

2. The hybrid vehicle according to claim 1, wherein:
the exhaust passageway is connected to the internal combustion engine at one end portion thereof and includes:
a first exhaust passageway which passes through a far side of the first motor in relation to the second motor in an alignment direction of the first and the second motors; and
a second exhaust passageway which passes through a far side of the second motor in relation to the first motor in the alignment direction.

3. The hybrid vehicle according to claim 1, wherein:
the driving system further includes a first and a second speed changers in addition to the first and the second motors;
the first motor and the first speed changer are connected to a left wheel of the vehicle to enable to transmit power;
the second motor and the second speed changer are connected to a right wheel of the vehicle to enable to transmit power;
the first motor is disposed on a left side in the left-right direction, and the second motor is disposed on a right side in the left-right direction; and
the first and the second speed changers are disposed inside the first and the second motors in the left-right direction.

4. The hybrid vehicle according to claim 1, wherein the exhaust passageway is disposed so as to define a gap with respect to the housing over an entire length thereof.

5. The hybrid vehicle according to claim 1, wherein the internal combustion engine is connected to wheels of the vehicle to enable to transmit power.

6. The hybrid vehicle according to claim 2, wherein:
the first exhaust passageway and the second exhaust passageway include a common portion where the first and the second exhaust passageways form a common flow path at a portion closer to the internal engine than to the first plane; and the common portion is disposed at a position intersecting with an imaginary plane which is perpendicular to the alignment direction of the first and the second motors and which is disposed at an equal distance from the first and the second motors.

7. The hybrid vehicle according to claim 2, wherein the internal combustion engine is disposed in a position intersecting with an imaginary plane which is perpendicular to the alignment direction of the first and the second motors and which is disposed at an equal distance from the first and the second motors.

8. The hybrid vehicle according to claim 6, further comprising an oil pump which is disposed on an outer surface of the driving system and which can receive heat from the exhaust passageway, wherein
the oil pump is disposed in a rear horizontal projection area of the common portion.

9. The hybrid vehicle according to claim 8, wherein the exhaust passageway, the oil pump and the driving system are disposed in this order from a front side in the front-rear direction.

10. The hybrid vehicle according to claim 8, wherein the exhaust passageway and a surface of the oil pump which is directed to a front side in the front-rear direction are disposed opposite to each other.

11. The hybrid vehicle according to claim 8, wherein at least a portion of the exhaust passageway which is positioned further forwards in the front-rear direction than a surface of the oil pump which is directed to a front side in the front-rear direction is disposed further downwards than a lowermost surface of the oil pump in a vertical direction.

12. The hybrid vehicle according to claim 8, wherein a surface of the oil pump which is directed to a front side in the front-rear direction is formed so as to have a plane perpendicular to the front-rear direction.

13. The hybrid vehicle according to claim 8, wherein:
a diameter-expanded portion where the exhaust passageway is expanded radially is provided along the exhaust passageway in a position which is further forwards than the oil pump in the front-rear direction; and
the oil pump is disposed in a rear horizontal projection area of the diameter-expanded portion in addition to the rear horizontal projection area of the common portion.

14. The hybrid vehicle according to claim 8, wherein the oil pump is disposed outside an upper vertical projection area of the exhaust passageway.

15. The hybrid vehicle according to claim 11, wherein the exhaust passageway is formed so as to be inclined in the front-rear direction so that a side closer to the oil pump is lower than a side closer to the internal combustion engine in the vertical direction, at a portion which is further forwards in the front-rear direction than the surface of the oil pump which is directed to the front side in the front-rear direction.

16. The hybrid vehicle according to claim 14, wherein the oil pump is constituted by an electric oil pump which is electrically driven.

17. The hybrid vehicle according to claim 3, wherein:
respective rotational axes of the first motor, the first speed changer, the second motor, and the second speed changer are disposed on a same axis;
the first speed changer is disposed on a power transmission path between the first motor and the left wheel;
the second speed changer is disposed on a power transmission path between the second motor and the right wheel;
a power transmission path between the first motor and the first speed changer has a hollow structure;
a power transmission path between the first speed changer and the left wheel is inserted through an inside of the hollow structure;
a power transmission path between the second motor and the second speed changer has another hollow structure; and
a power transmission path between the second speed changer and the right wheel is inserted through an inside of the another hollow structure.

18. The hybrid vehicle according to claim 3, wherein the first and the second speed changers are formed by connecting together at least one element which constitutes the first speed changer and at least one element which constitutes the second speed changer.

19. The hybrid vehicle according to claim 17, wherein the first and the second speed changers are planetary gear mechanisms.

* * * * *